(12) United States Patent
Bhave et al.

(10) Patent No.: US 11,144,682 B2
(45) Date of Patent: Oct. 12, 2021

(54) DATA PROCESSING SYSTEM AND METHOD FOR ASSEMBLING COMPONENTS IN A COMPUTER-AIDED DESIGN (CAD) ENVIRONMENT

(71) Applicant: Siemens Industry Software Inc., Plano, TX (US)

(72) Inventors: Mayur Bhave, Maharashtra (IN); Omkar Joshi, Maharashtra (IN); Sandeep Kanitkar, Maharashtra (IN)

(73) Assignee: SIEMENS PRODUCT LIFECYCLE MANAGEMENT SOFTWARE INC., Plano, TX (US)

( * ) Notice: Subject to any disclaimer, the term of this patent is extended or adjusted under 35 U.S.C. 154(b) by 633 days.

(21) Appl. No.: 15/771,402

(22) PCT Filed: Sep. 7, 2016

(86) PCT No.: PCT/US2016/050563
§ 371 (c)(1),
(2) Date: Apr. 26, 2018

(87) PCT Pub. No.: WO2017/074559
PCT Pub. Date: May 4, 2017

(65) Prior Publication Data
US 2018/0349546 A1    Dec. 6, 2018

(30) Foreign Application Priority Data

Oct. 27, 2015   (IN) .......................... 1113/KOL/2015

(51) Int. Cl.
*G06F 30/17*   (2020.01)
*G06T 19/20*   (2011.01)
(Continued)

(52) U.S. Cl.
CPC .............. *G06F 30/17* (2020.01); *G06T 17/10* (2013.01); *G06T 19/20* (2013.01);
(Continued)

(58) Field of Classification Search
CPC ....................................................... G06F 30/17
See application file for complete search history.

(56) References Cited

U.S. PATENT DOCUMENTS 6,219,049 B1 * 4/2001 Zuffante ................ G06T 19/20
715/764
6,725,184 B1   4/2004 Gadh
(Continued)

FOREIGN PATENT DOCUMENTS

EP    2279477 A1    2/2011
WO   0019381 A1    4/2000

OTHER PUBLICATIONS

Betteridge, Michael. "A methodology for aggregate assembly modelling and planning". Diss. Durham University, 2000 (Year: 2000).*

(Continued)

*Primary Examiner* — Omar F Fernandez Rivas
*Assistant Examiner* — David A Hopkins
(74) *Attorney, Agent, or Firm* — Lempia Summerfield Katz LLC

(57) ABSTRACT

A data processing system and method for assembling components in a computer-aided design (CAD) environment is disclosed. In one embodiment, a computer-implemented method of assembling components in a CAD environment includes determining, using a data processing system, a source component and a target component in the CAD environment. The source component and the target component represent different parts of a real-world object. The method includes determining geometric feature(s) of the source component and geometric feature(s) of the target (Continued)

component, and comparing the geometric features of the source component with the geometric features of the target component. The method includes generating constraints between the geometric features of the source component and the geometric features of the target component based on the outcome of the comparison. The method also includes outputting a geometric model of the assembled source component and target component on a graphical user interface.

14 Claims, 18 Drawing Sheets

(51) Int. Cl.
    *G06T 17/10* (2006.01)
    *G06F 111/02* (2020.01)
    *G06F 111/04* (2020.01)
    *G06F 111/20* (2020.01)
(52) U.S. Cl.
    CPC ....... *G06F 2111/02* (2020.01); *G06F 2111/04* (2020.01); *G06F 2111/20* (2020.01)

(56) References Cited

U.S. PATENT DOCUMENTS

| | | | |
|---|---|---|---|
| 7,079,990 | B2 | 7/2006 | Haller |
| 8,305,376 | B2 | 11/2012 | Ran |
| 8,645,107 | B2 | 2/2014 | Gibson |
| 9,811,610 | B2 | 11/2017 | Kannan |
| 2002/0107673 | A1 | 8/2002 | Haller |
| 2003/0189566 | A1 | 10/2003 | Fuki |
| 2006/0267980 | A1 | 11/2006 | Onoue |
| 2008/0294388 | A1 | 11/2008 | Tabeling |
| 2010/0060635 | A1 | 3/2010 | Corcoran |
| 2011/0098837 | A1 | 4/2011 | Yuecel |
| 2012/0316841 | A1 | 12/2012 | Rameau |
| 2013/0080121 | A1 | 3/2013 | Gibson |
| 2014/0025349 | A1 | 1/2014 | Diguet |
| 2015/0121309 | A1 | 4/2015 | Reed |
| 2016/0246897 | A1 | 8/2016 | Kannan |
| 2017/0066092 | A1* | 3/2017 | Yamamoto ....... G05B 19/41805 |

OTHER PUBLICATIONS

Aziz, EL-Sayed S., et al. "Virtual mechanical assembly training based on a 3D game engine." Computer-Aided Design and Applications 12.2 (2015): 119-134. (Year: 2015).*
Mattikalli, R. S., P. K. Khosla, and Y. Xu. "Subassembly identification and motion generation for assembly: a geometric approach." 1990 IEEE International Conference on Systems Engineering. IEEE, 1990. (Year: 1990).*
Anantha, Ram, Glenn A. Kramer, and Richard H. Crawford. "Assembly modelling by geometric constraint satisfaction." Computer-Aided Design 28.9 (1996): 707-722. (Year: 1996).*
Alfadhlani, et al. "Automatic collision detection for assembly sequence planning using a three-dimensional solid model." Journal of Advanced Manufacturing Systems 10.02 (2011): 277-291. (Year: 2011).*
Bai, Y. W., et al. "An effective integration approach toward assembly sequence planning and evaluation." The International Journal of Advanced Manufacturing Technology 27.1-2 (2005): 96-105. (Year: 2005).*
Eng, Tiam-Hock, et al. "Feature-based assembly modeling and sequence generation." Computers & Industrial Engineering 36.1 (1999): 17-33. (Year: 1999).*
Ben Hadj, Riadh, Moez Trigui, and Nizar Aifaoui. "Toward an integrated CAD assembly sequence planning solution." Proceedings of the Institution of Mechanical Engineers, Part C: Journal of Mechanical Engineering Science 229.16 (2015): 2987-3001. (Year: 2015).*
Van Holland, Winfried, and Willem F. Bronsvoort. "Assembly features in modeling and planning." Robotics and computer-integrated manufacturing 16.4 (2000): 277-294. (Year: 2000).*
Kwon, Soonjo, et al. "Simplification of feature-based 3D CAD assembly data of ship and offshore equipment using quantitative evaluation metrics." Computer-Aided Design 59 (2015): 140-154. (Year: 2015).*
Trigui, Moez, Riadh BenHadj, and Nizar Aifaoui. "An interoperability CAD assembly sequence plan approach." The International Journal of Advanced Manufacturing Technology 79.9-12 (2015): 1465-1476. (Year: 2015).*
Ye, N., and D. A. Urzi. "Heuristic rules and strategies of assembly planning: experiment and implications in the design of assembly decision support system." International journal of production research 34.8 (1996): 2211-2228. (Year: 1996).*
Zha, Xuan F., and H. Du. "A PDES/STEP-based model and system for concurrent integrated design and assembly planning." Computer-Aided Design 34.14 (2002): 1087-1110. (Year: 2002).*
Mathew, Arun, and C. S. P. Rao. "A CAD system for extraction of mating features in an assembly." Assembly Automation (2010). (Year: 2010).*
Jankowski et al., "Smart Mates Save Time in Assemblies", Apr. 30, 2003, Cadalyst Blog Posting (Year: 2003).*
Leu, Ming C., et al. "CAD model based virtual assembly simulation, planning and training." CIRP Annals 62.2 (2013): 799-822. (Year: 2013).*
Planchard, David C., and Marie P. Planchard. Assembly Modeling with SolidWorks 2012. SDC Publications, 2012. (Year: 2012).*
Da Xu, Li, et al. "AutoAssem: an automated assembly planning system for complex products." IEEE Transactions on Industrial Informatics 8.3 (2012): 669-678. (Year: 2012).*
Mojarad, "Redundancies in SOLIDWORKS Motion Analysis", Javelin Tech, Blog Posting, Jul. 16, 2018 (Year: 2018).*
Yu, Jian-feng, et al. "CAD model simplification for assembly field." The International Journal of Advanced Manufacturing Technology 68.9-12 (2013): 2335-2347. (Year: 2013).*
You, Chun-Fong, and Chui-Chien Chiu. "An automated assembly environment in feature-based design." The international journal of advanced manufacturing technology 12.4 (1996): 280-287. (Year: 1996).*
Singh, Palwinder, and Bernhard Bettig. "Port-compatibility and connectability based assembly design." J. Comput. Inf. Sci. Eng. 4.3 (2004): 197-205. (Year: 2004).*
Li, Gui-dong, et al. "A system for supporting rapid assembly modeling of mechanical products via components with typical assembly features." The International Journal of Advanced Manufacturing Technology 46.5 (2010): 785-800. (Year: 2010).*
Barnes, C. J., G. E. M. Jared, and K. G. Swift. "Decision support for sequence generation in an assembly oriented design environment." Robotics and Computer-Integrated Manufacturing 20.4 (2004): 289-300. (Year: 2004).*
ElMaraghy, Hoda A. "Artificial intelligence and robotic assembly." Engineering with computers 2.3 (1987): 147-155.
Rabemanantsoa, Moniy, and Samuel Pierre. "An artificial intelligence approach for generating assembly sequences in CAD/CAM." Artificial intelligence in engineering 10.2 (1996): 97-107.
PCT International Examination Report and Written Opinion of International Examination Authority dated Dec. 15, 2016 corresponding to PCT International Application No. PCT/US2016/050563 filed Sep. 7, 2016.
Wang, Eric, and Yong Se Kim. "Feature-based assembly mating reasoning." Journal of Manufacturing systems 18.3 (1999): 187.

* cited by examiner

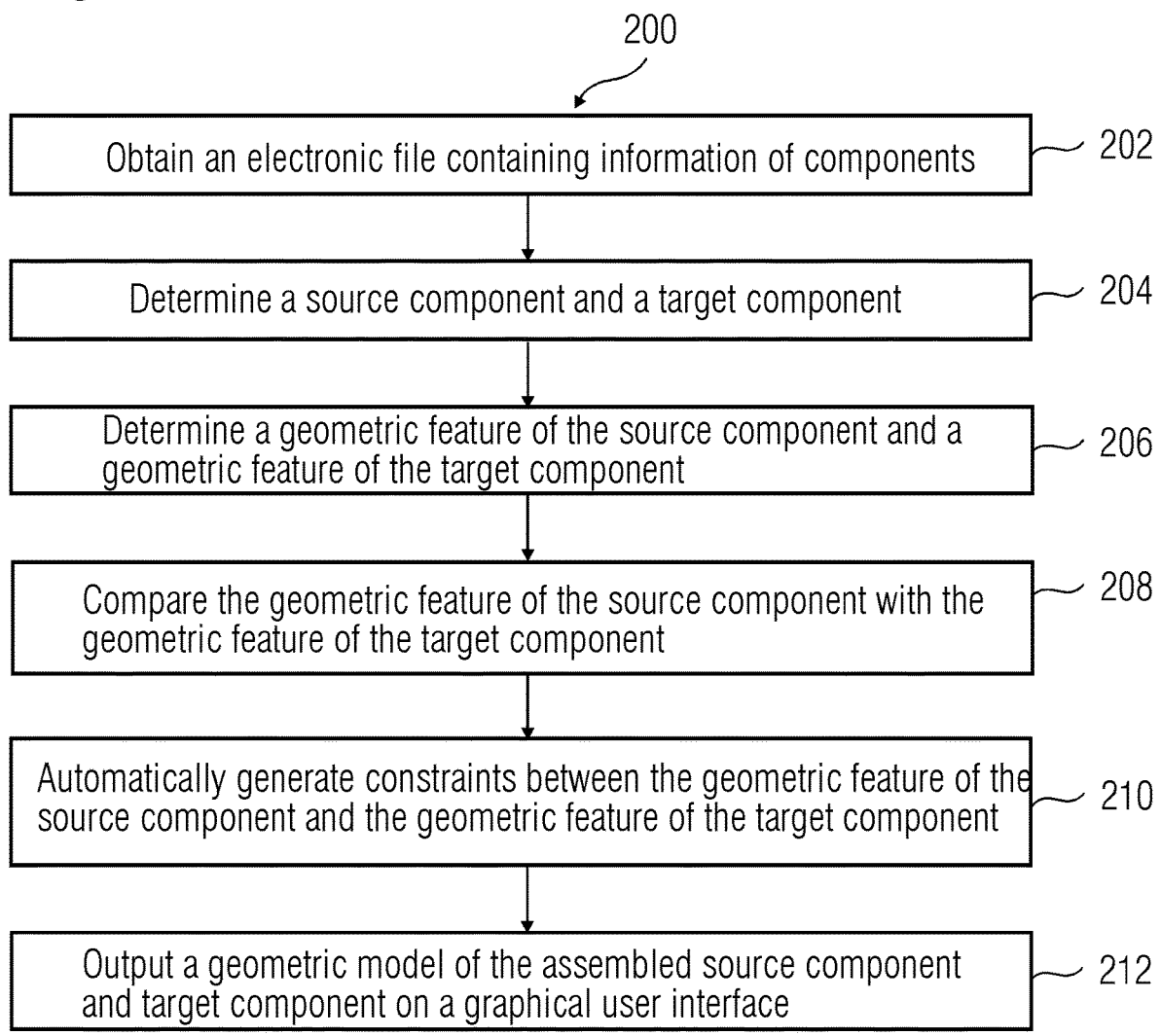

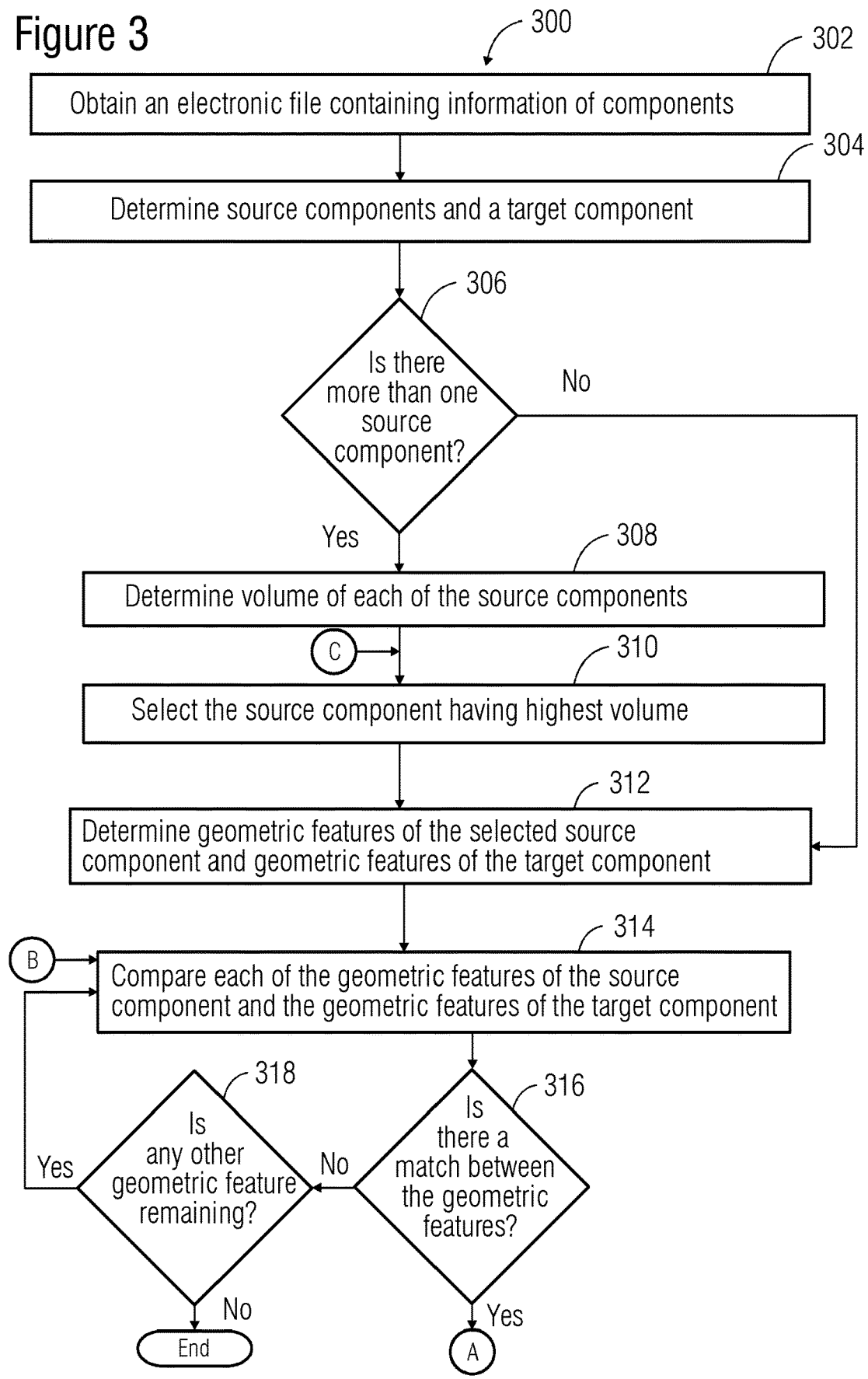

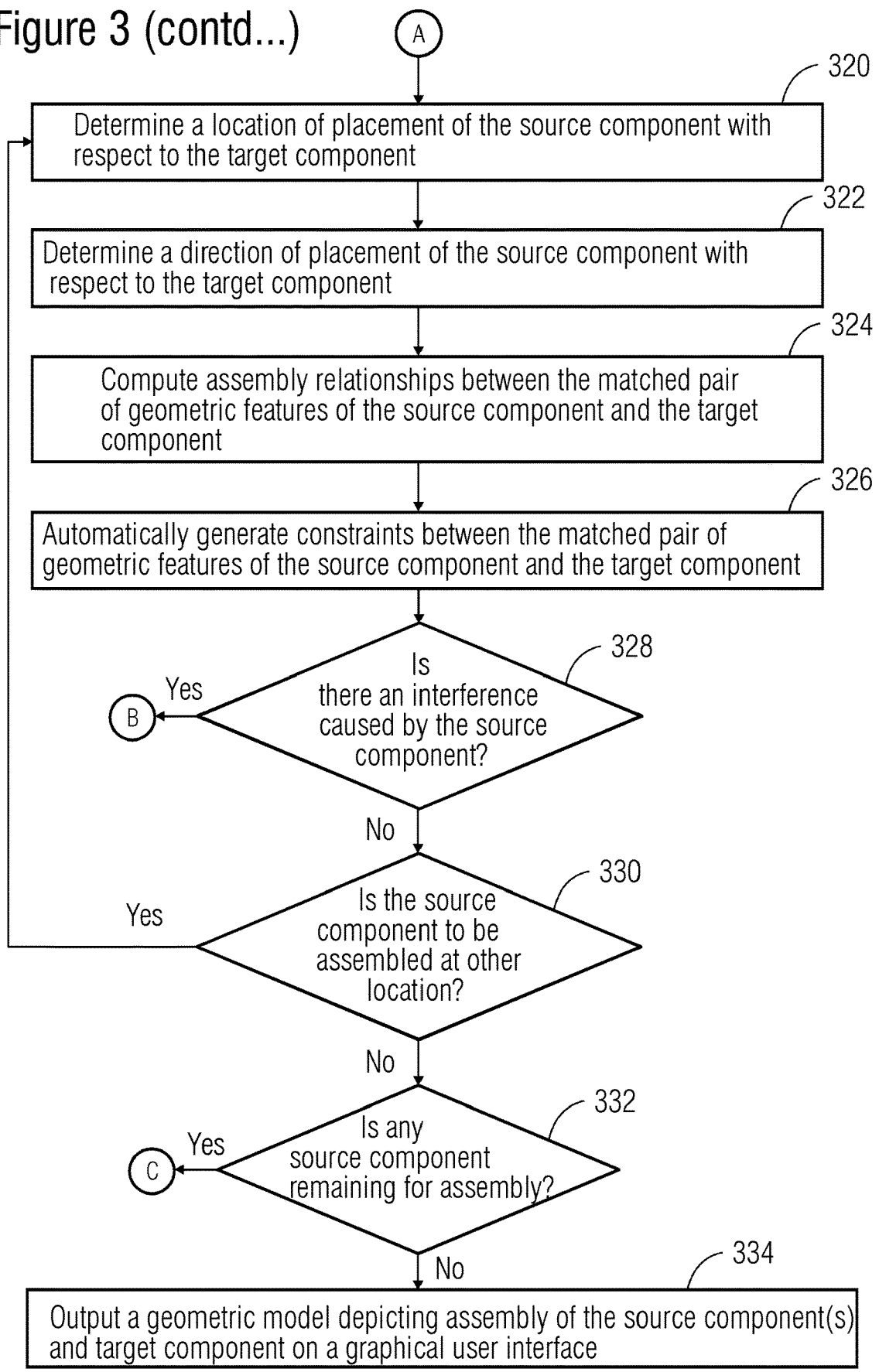
Figure 3 (contd...)

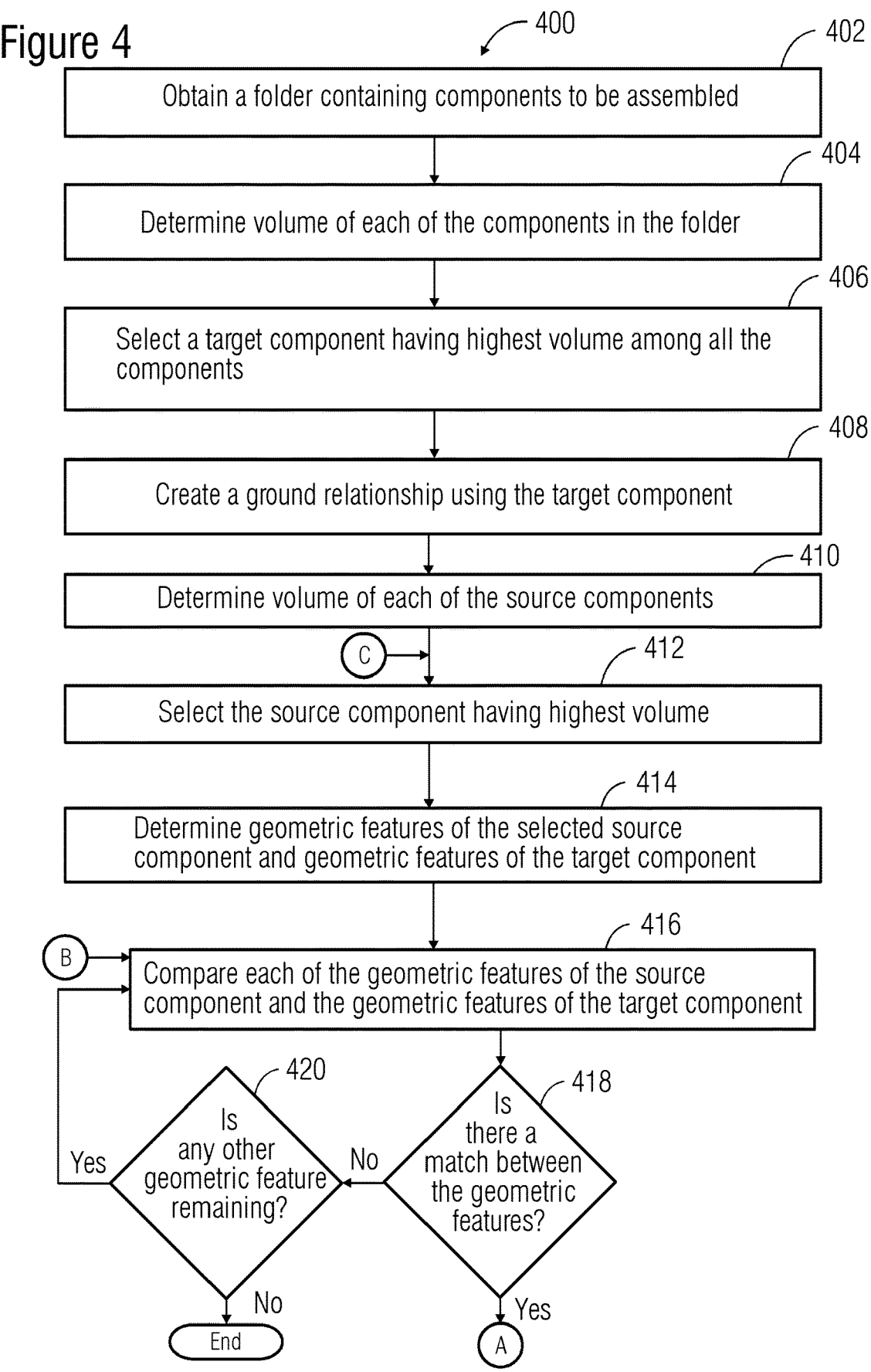

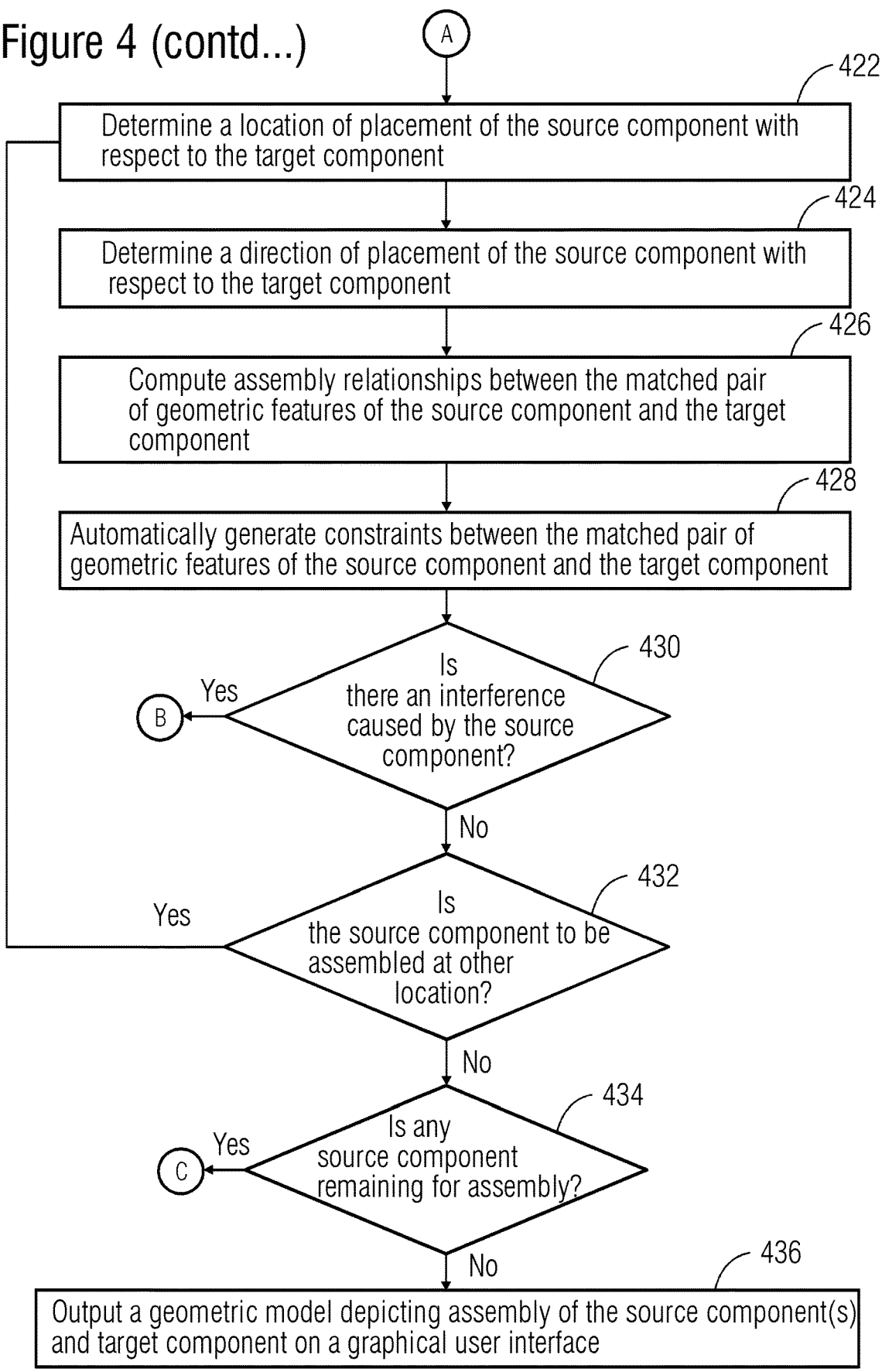
Figure 4 (contd...)

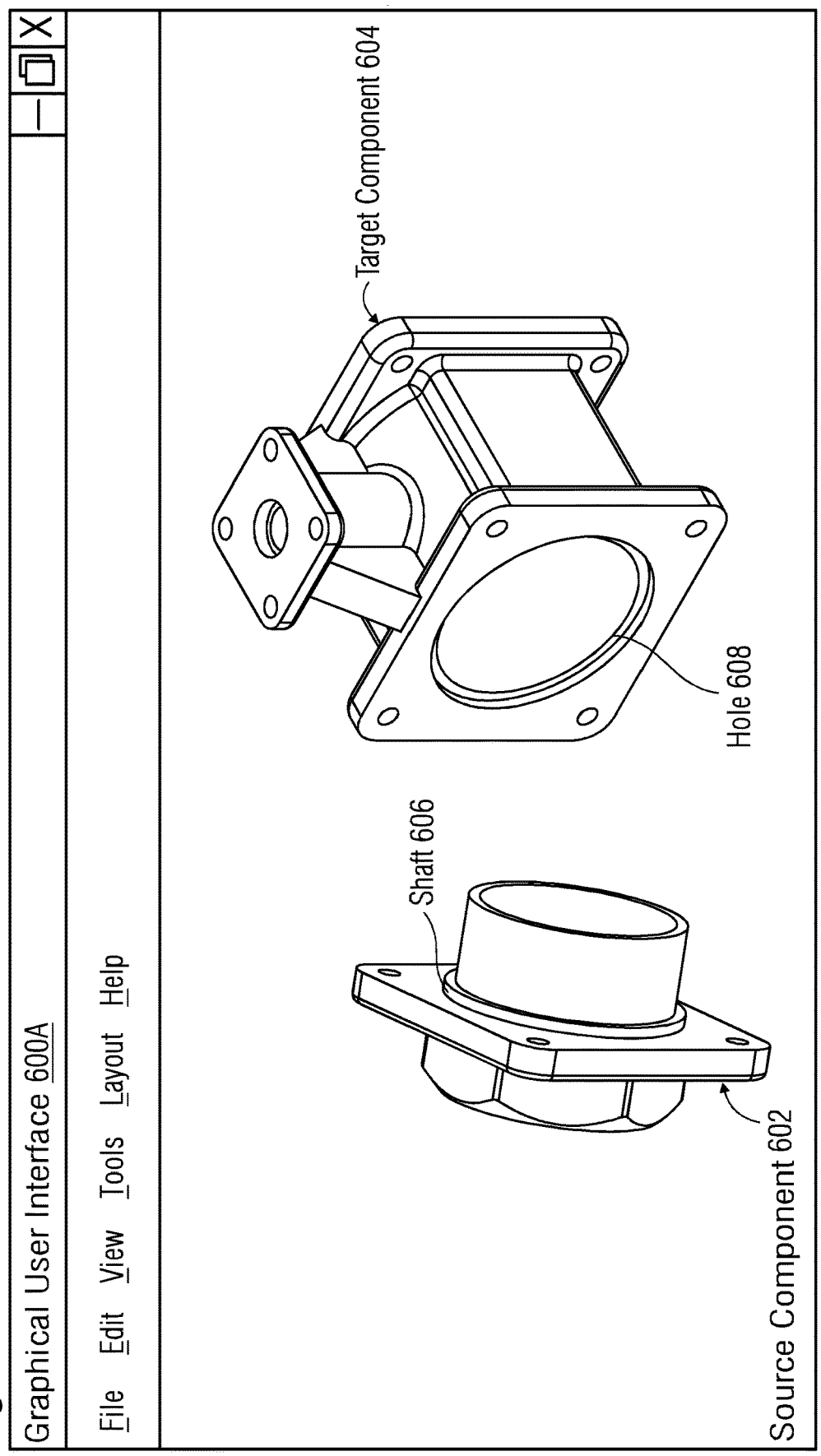

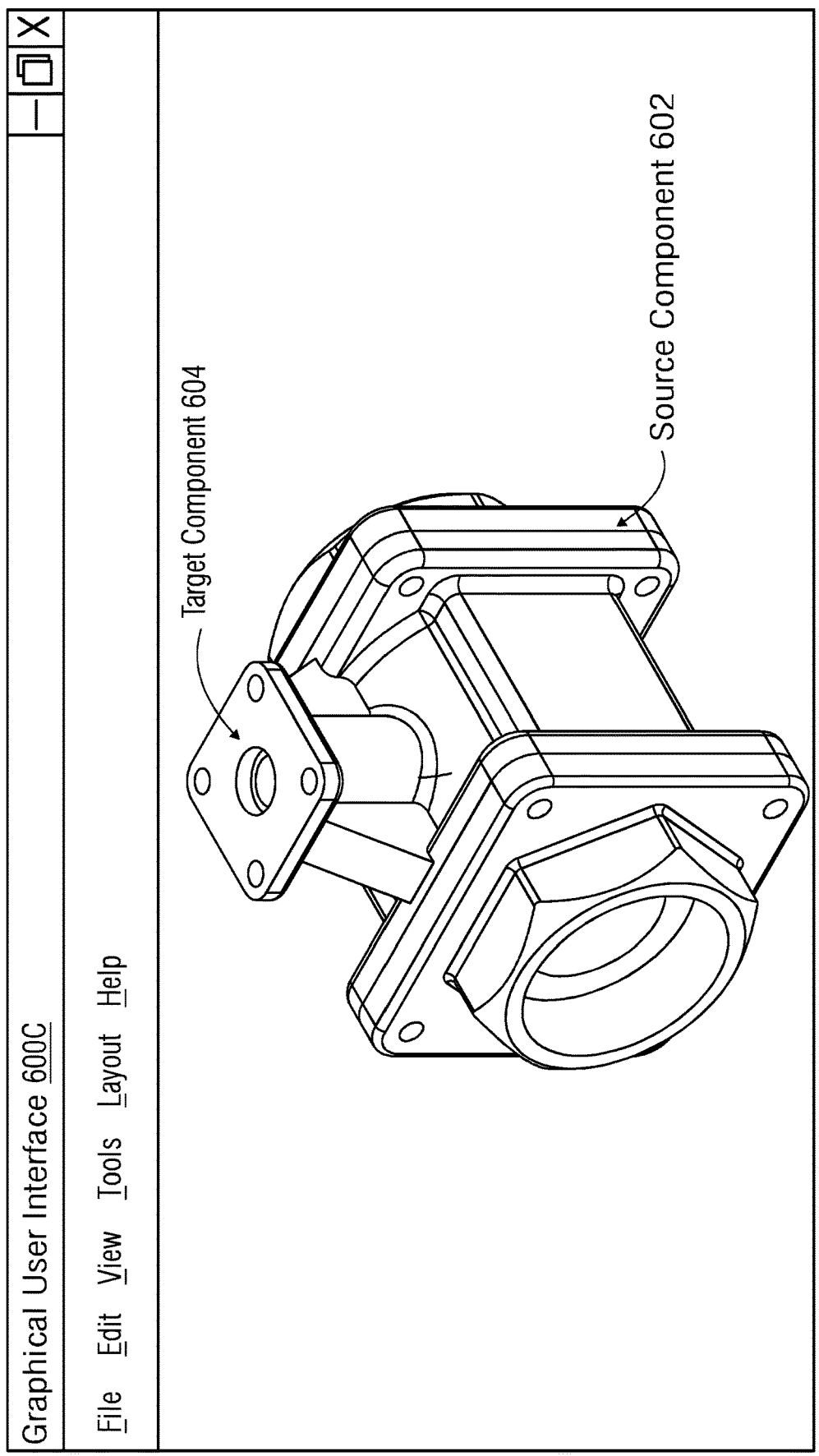

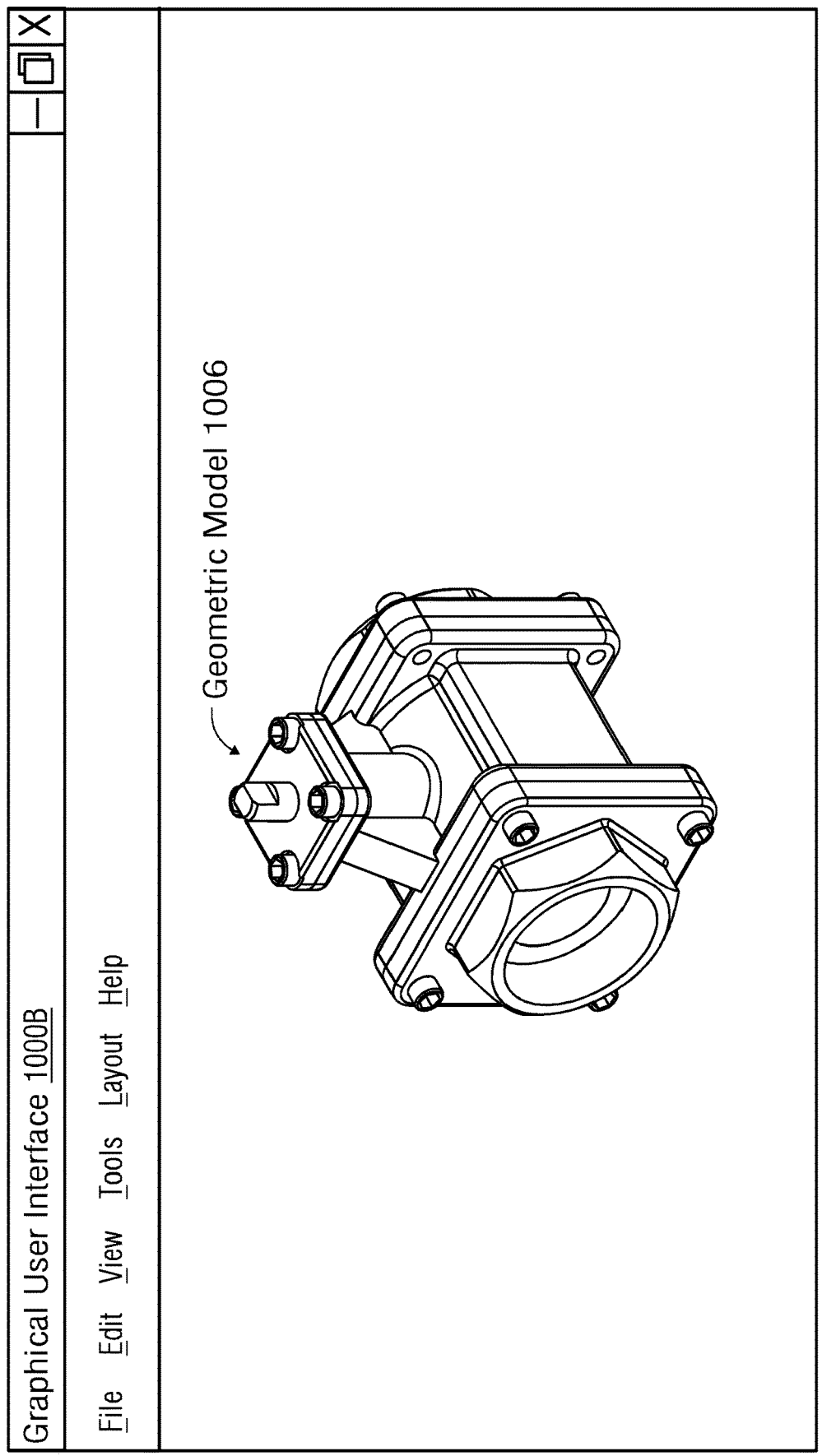

DATA PROCESSING SYSTEM AND METHOD FOR ASSEMBLING COMPONENTS IN A COMPUTER-AIDED DESIGN (CAD) ENVIRONMENT

CROSS-REFERENCE TO OTHER APPLICATION

The present application has some subject matter in common with, but is not necessarily otherwise related to, commonly-assigned U.S. patent application Ser. No. 14/818,089, filed on Aug. 4, 2015, which is by reference herein.

PRIORITY CLAIM

This application is the National Stage of International Application No. PCT/US2016/050563, filed Sep. 7, 2016, which claims the benefit of Indian Provisional Application No. 1113/KOL/2015, filed on Oct. 27, 2015. These documents are hereby incorporated by reference in their entirety.

FIELD OF TECHNOLOGY

The present disclosure relates to the field of computer-aided design (CAD), and more particularly to data processing systems and methods for assembling components in a CAD environment.

BACKGROUND

Computer-aided design (CAD) is use of a computer system to assist user in creation, modification, and analysis of a complex three dimensional (3D) geometric models generally outputted as electronic files for print, machining, or other manufacturing operations. Typically, a design engineer may use CAD software loaded on the computer system to construct a 3D geometric model of a real-world object. For example, the design engineer may create various components of a real-world object using the CAD software and assemble the components into one or more subassemblies. Then, the design engineer may assemble the one or more subassemblies to form a 3D geometric model of the real-world object.

Assembling of the components involves positioning of components in a 3D geometric model and/or creating appropriate constraint relationships (i.e., mating relationships) among different geometrical entities (e.g., face, edge, etc.) of the components in the 3D geometric model. This requires a lot of manual intervention and is typically a tedious process. For example, in order to define constraint relationship for two components, the design engineer is to input geometrical entities of source and target components to be assembled and manually define type constraint relationship between the entities. Another known technique allows the design engineer to manually pre-define several constraint relationships for multiple geometric entities of components in advance. Accordingly, in real time, the components are constrained if certain conditions are satisfied based on the pre-defined constrained relationships. However, pre-defining constraint relationships ahead of time may be a cumbersome, time consuming task, and error-prone process.

SUMMARY OF THE INVENTION

A data processing system and method for assembling components in a computer-aided design (CAD) environment is disclosed. In one aspect, a computer-implemented method of assembling components in a computer-aided design (CAD) environment includes determining, using a data processing system, at least one source component and a target component in the CAD environment. The source component and the target component represent different parts of a real-world object. Also, the method includes determining one or more geometric features of the source component and one or more geometric features of the target component, and comparing the geometric features of the source component with the geometric features of the target component. The method also includes generating constraints between the geometric features of the source component and the geometric features of the target component based on the outcome of the comparison.

In another aspect, a data processing system includes a processor, a display unit coupled to the processor, and an accessible memory coupled to the processor. The memory includes a computer-aided design module configured to determine at least one source component and a target component in a computer-aided design (CAD) environment. The computer-aided design module is configured to determine one or more geometric features of the source component and one or more geometric features of the target component, and comparing the geometric features of the source component with the geometric features of the target component. The computer-aided design module is configured to generate constraints between the geometric features of the source component and the geometric features of the target component based on the outcome of the comparison. The computer-aided design module is also configured to output a geometric model of the assembled source component and target component on the display unit.

In yet another aspect, a non-transitory computer-readable storage medium having instructions stored therein, which when executed by a data processing system, cause the data processing system to perform the method steps described above is provided.

This summary is provided to introduce a selection of concepts in a simplified form that are further described below in the following description. The summary is not intended to identify features or essential features of the claimed subject matter. The claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings:

FIG. 2 is a process flowchart illustrating an exemplary method of assembling components that represent different parts of a real-world object in a computer-aided design (CAD) environment, according to one embodiment;

FIG. 3 is a process flowchart illustrating a detailed process of assembling components in the CAD environment, according to one embodiment;

FIG. 4 is a process flowchart illustrating a detailed process of assembling components in the CAD environment, according to another embodiment;

FIGS. 10A and 10B are graphical user interface views depicting assembly of multiple source components with a target component, according to another embodiment.

DETAILED DESCRIPTION

Figure 1:
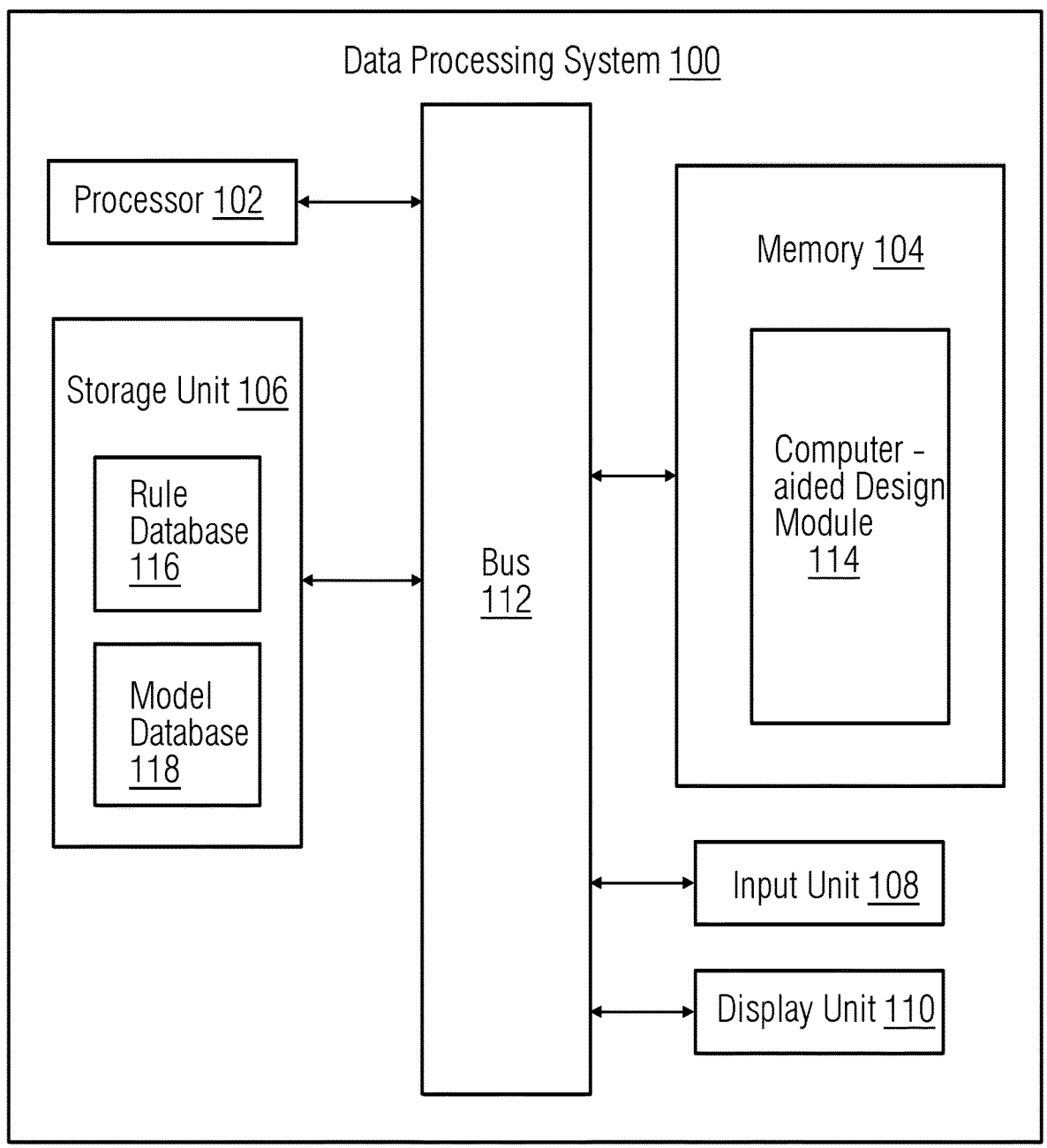
FIG. 1 illustrates a block diagram of a data processing system in which an embodiment may be implemented.

A data processing system and method for assembling components in a computer-aided design (CAD) environment is disclosed. Various embodiments are described with reference to the drawings, where like reference numerals are used as in reference to the drawings, and like reference numerals are used to refer to like elements throughout. In the following description, numerous specific details are set forth in order to provide thorough understanding of embodiments of the present disclosure. It will be apparent, however, to one skilled in the art, that these specific details need not be employed to practice embodiments of the present disclosure. In other instances, well known materials or methods have not been described in detail in order to avoid unnecessarily obscuring embodiments of the present disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed; on the contrary, the disclosure is to cover all modifications, equivalents, and alternatives falling within the spirit and scope of the present disclosure.

FIG. 1 illustrates a block diagram of a data processing system 100 in which an embodiment may be implemented, for example, as a computer-aided design system particularly configured by software or otherwise to perform the processes as described herein. The data processing system 100 may be a personal computer, a laptop computer, a tablet, and the like. In FIG. 1, the data processing system 100 includes a processor 102, an accessible memory 104, a storage unit 106, an input unit 108, a display unit 110, and a bus 112.

The processor 102, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processor 102 may also include embedded controllers, such as generic or programmable logic devices or arrays, application specific integrated circuits, single-chip computers, and the like.

The memory 104 may be non-transitory volatile memory and non-volatile memory. The memory 104 may be coupled for communication with the processor 102, such as being a computer-readable storage medium. The processor 102 may execute instructions and/or code stored in the memory 104. A variety of computer-readable instructions may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes a computer-aided design module 114 stored in the form of machine-readable instructions on any of the above-mentioned storage media and may be in communication with and executed by processor 102. When executed by the processor 102, the computer-aided design module 114 causes the processor 102 to constrain components representing parts of a real-world object in a CAD environment and generate a geometric model including the constrained components. Method steps performed by the processor 102 to achieve the above functionality are described in greater detail in FIGS. 2 to 4.

The storage unit 106 may be a non-transitory storage medium that stores a rule database 116 and a model database 118. The rule database 116 stores a set of rules pre-defined for assembling components in a CAD environment. The model database 118 stores geometric models including constrained components. The input unit 108 may include input devices such as a keypad, touch-sensitive display, camera (such as a camera receiving gesture-based inputs), etc. capable of receiving an input signal such as a file including information of components to be constrained. The display unit 110 may be a device for displaying a graphical user interface that visualizes a geometric model containing constrained components. The bus 112 acts as interconnect between the processor 102, the memory 104, the storage unit 106, the input unit 108, and the output unit 110.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Disclosed embodiments provide systems and methods that generate constraints between components in a CAD environment. In particular, disclosed techniques may identify and match geometric features of components to assemble the components in the CAD environment.

FIG. 2 is a process flowchart 200 illustrating an exemplary method of assembling components that represent different parts of a real-world object in a CAD environment, according to one embodiment. At step 202, an electronic file(s) containing information of components to be constrained is obtained. For example, the electronic file may be a CAD file and may contain geometric information of parts of a real-world object hereinafter referred to as components. The electronic file may be obtained from a location provided by a user of the data processing system 100. The components given in the electronic file may be displayed on a graphical user interface (e.g., the graphical user interface 600A) of the data processing system 100.

At step 204, a source component and a target component are determined from the electronic file. For example, the component that is to be mated with another component is determined as 'source component' while the component with which another component is to be mated is known as 'target component'. The target component may be a single component or includes an assembly of various components. In another exemplary implementation, the source component and the target component may be determined based on volume. The component with the highest volume is identified as target component. In yet another exemplary implementation, the source component and the target component are identified based on input by the user of the data processing system 100. For example, the user may perform a 'drag' operation on a component with respect to another component using a mouse. The component on which 'drag' operation is performed on the graphical user interface is determined as 'source component'. The other component is determined as 'the target component'.

At step 206, a geometric feature of the source component and a geometric feature of a target component are determined. The geometric feature may include a shaft, hole, taper shaft, taper hole, keyway shaft, keyway hole, extruded feature, cutout feature and so on. In some embodiments, the geometric features of the source component and the target component are identified using a feature recognition algorithm. Any feature recognition algorithm well known to the person skilled in the art may be used to determine the geometric features of the source component and the target component.

At step 208, the geometric feature of the source component is compared with the geometric feature of the target component. The geometric feature of the source component is compared with the geometric feature of the target component to determine possibility of assembly between the source component and the target component. For example, consider that a shaft of a source component and a hole of a target component are identified by the feature recognition algorithm. In such case, diameter of the shaft is compared with the diameter of the hole to determine whether the shaft of the source component would fit in the hole of the target component. If the shaft with a tolerance value equal to 0.0 mm, +0.2 mm is identified, then holes with diameter equal to the diameter of the shaft or greater than +0.02 mm are compared.

At step 210, constraints between the geometric feature of the source component and the geometric feature of the target component are generated based on the outcome of the comparison. That is, the constraints are generated if the geometric feature of the source component matches with the geometric feature of the target component, thereby creating an assembly between the source component and the target component. The geometric information associated with the source component and the target component, and the associated constraints are stored in the model database 118. At step 212, a geometric model of the assembled source component and target component is outputted on a graphical user interface. For example, the geometric model including the assembled source component and target component is visualized on the graphical user interface. In this manner, components that represent different parts of a real-world object are assembled. The detailed process of assembling components is given below.

FIG. 3 is a process flowchart 300 illustrating a detailed process of assembling components in a CAD environment, according to one embodiment. At step 302, an electronic file containing information of the components is obtained. At step 304, one or more source components and a target component are determined. For example, the one or more source components and the target component are determined upon receiving a user command to generate assembly of the components. The user command may indicate whether a single source component is to be assembled or multiple source components are to be assembled with the target component. The target component is placed at origin (0,0,0 coordinates) and a ground relationship is created. At step 306, it is determined whether there is more than one source component selected for assembling with the target component.

If a single source component is selected for assembly, step 312 is performed directly. If multiple source components are identified at step 304, then step 308 is performed. At step 308, a volume of each of the source components is determined. For example, the volume of the each of the source components may be determined from the electronic file. Alternatively, the volume of each source component is computed using mathematical formulae. At step 310, the source component with the highest volume among the source components is selected.

At step 312, one or more geometric features of the selected source component and one or more geometric features of the target component is determined. At step 314, each of the geometric features of the source component is compared with the geometric features of the target component. In one embodiment, the geometric features of the source component and the geometric features of the target component are sorted based on a pre-determined order of comparison. For example, the pre-determined order of comparison is given in table 1 below:

TABLE 1

| Order | Source Component | Target component |
|---|---|---|
| 1 | Shaft (smallest to largest) | Hole (smallest to largest) |
| 2 | Hole (largest to smallest) | Hole (largest to smallest) |
| 3 | Hole (largest to smallest) | Shaft (largest to smallest) |
| 4 | Shaft (smallest to largest) | Shaft (smallest to smallest) |
| 5 | Taper Shaft (largest to smallest) | Taper Hole (largest to smallest) |
| 6 | Taper Hole (largest to smallest) | Taper Shaft (largest to smallest) |
| 7 | Keyway shaft (smallest to largest) | Keyway Hole (smallest to largest) |
| 8 | Keyway Hole (largest to smallest) | Keyway shaft (largest to smallest) |
| 9 | Extruded feature (smallest to largest) | Cutout feature (smallest to largest) |
| 10 | Cutout feature (largest to smallest) | Extruded feature (largest to smallest) |
| 11 | Cutout Feature (largest to smallest) | Cutout feature (largest to smallest) |
| 12 | Extruded feature (smallest to largest) | Extruded feature (smallest to largest) |

In this embodiment, each geometric feature of the source component is compared with corresponding geometric feature of the target component according to the sorted order. In some embodiments, it is determined whether same geometric features are present in any of the source component or the target component. If the same geometric features are present, then each geometric feature of same type of the source component with the corresponding geometric feature of the target component according to the size of the geometric features. For example, a shaft having smallest size is compared with a hole of a smallest size followed by comparison of shaft of higher size with a hole of higher size and so on.

At step 316, it is determined whether there is a match between the geometric feature of the source component and any of the geometric features of the target component. If no match is found, then at step 318, it is determined whether any geometric feature of the source component is remaining for comparison with the geometric feature of the target component. If any geometric feature is remaining, then step 314 is performed. If no geometric feature of the source component is remaining, the process 300 is ended.

If there is a match between the geometric feature of the source component and the geometric feature of the target component, then at step 320, location of placement of the source component with respect to the target component is determined. There may be multiple locations where the source component can be placed with respect to the target component. Consider that, a target component is a flange including four holes, and a source component is an Allen screw. In such case, the Allen screw is matching with four holes of the flange. The first location (one of four holes) where the Allen screw should be placed is determined. The location may be determined based on a set of rules stored in the rule database 116. Alternatively, the location of placement may be selected based on a user input. That is, the user may specify the hole where the Allen screw should be placed.

At step 322, direction of placement of the source component with respect to the target component is determined. The direction of placement of the source component may be determined based on the set of rules stored in the rule database 116. A rule may be pre-defined which states that 'the source component should be assembled from outside to inside'. In such case, the direction of placement of the source component is determined as from outside to inside. The direction of placement is also determined based on point of placement and center of volume of the target component.

At step 324, assembly relationships between the matched pair of geometric features of the source component and the target component are computed. The assembly relationships are computed based on the set of rules stored in the rule database 116. Exemplary assembly relationships may include axial align, mate, or planar align assembly relationships between faces of the geometric feature of the source component and the geometric feature of the target component. The assembly relationships are computed such that it constrains 6 degrees of freedom.

At step 326, constraints between the matched pair of geometric features of the source component and the target component are generated based on the assembly relationships between the matched pair of the geometric features. At step 328, it is determined whether there is interference caused due to assembly of the source component with the target component. Existing interference detection algorithms may be used to detect interference caused due to assembly of the source component and the target component.

If interference is detected, then the process 300 is routed to step 314 in which the geometric feature of the source component is compared with next available geometric feature of the target component. Alternatively, if the interference is detected, the process 300 may change the location of placement and/or the direction of placement of the source component. If no interference is detected, then at step 330, it is determined whether the source component is to be assembled at any other location of the target component. If it is determined that the source component is to be assembled at any other location, then the process 300 is routed to the step 320 in which another location of placement in the target component is determined.

If the source component is not to be assembled at any other location, then step 332 is performed. At step 332, it is determined whether there are any other source components remaining for assembling with the target component. If the source component(s) are remaining for assembling with the target component, then the process 300 is routed to the step 310. If all source components are assembled with the target component, then at step 334, a geometric model depicting assembly of the source components and the target component is outputted on a graphical user interface.

FIG. 4 is a process flowchart 400 illustrating a detailed process of assembling components in a CAD environment, according to another embodiment. At step 402, a folder containing the components to be assembled is obtained. At step 404, a volume of each of the components in the folder is determined. At step 406, a component that has the highest volume among all the components is selected. This component is hereinafter referred to as 'target component'. At step 408, a ground relationship is created using the target component.

At step 410, a volume of each of the source components is determined. At step 412, the source component with the highest volume among the source components is selected. At step 414, one or more geometric features of the selected source component and one or more geometric features of the target component is determined. At step 416, each of the geometric features of the source component is compared with the geometric features of the target component.

In one embodiment, the geometric features of the source component and the geometric features of the target component are sorted based on a pre-determined order of comparison. In this embodiment, each geometric feature of the source component is compared with corresponding geometric feature of the target component according to the sorted order. In some embodiments, it is determined whether same geometric features are present in any of the source component or the target component. If the same geometric features are present, then each geometric feature of same type of the source component with the corresponding geometric feature of the target component according to the size of the geometric features. For example, a shaft having smallest size is compared with a hole of a smallest size followed by comparison of shaft of higher size with a hole of higher size and so on.

At step 418, it is determined whether there is a match between the geometric feature of the source component and any of the geometric features of the target component. If no match is found, then at step 420, it is determined whether any geometric feature of the source component is remaining for comparison with the geometric feature of the target component. If any geometric feature is remaining, then step 416 is performed. If no geometric feature of the source component is remaining, the process 400 is ended.

If there is a match between the geometric feature of the source component and the geometric feature of the target component, then at step 422, location of placement of the source component with respect to the target component is determined. There may be multiple locations where the source component can be assembled with the target component. Consider that, a target component is a flange with four holes, and a source component is an Allen screw. In such case, the Allen screw is matching with four holes of the flange. The first location (one of four holes) where the Allen screw should be placed is determined. The location of placement may be determined based on a set of rules stored in the rule database 116. Alternatively, the location of placement may be selected based on a user input. That is, the user may specify the hole where the Allen screw should be placed.

At step 424, direction of placement of the source component with respect to the target component is determined. The direction of placement of the source component may be determined based on the set of rules stored in the rule database 116. A rule that states that "the source component should be assembled from outside to inside" may be predefined. In such case, the direction of placement of the source component is determined as from outside to inside.

At step 426, assembly relationships between the matched pair of geometric features of the source component and the target component are computed. The assembly relationships are computed based on the set of rules stored in the rule database 116. Exemplary assembly relationships may include axial align, mate, or planar align assembly relationships between faces of the geometric feature of the source component and the geometric feature of the target component.

At step 428, constraints between the matched pair of geometric features of the source component and the target component are generated based on the assembly relationships between the matched pair of the geometric features. At step 430, it is determined whether there is interference caused due to assembly of the source component with the target component.

If interference is detected, then the process 400 is routed to step 416, in which the geometric feature of the source component is compared with a next available geometric feature of the target component. Alternatively, if the interference is detected, the process 400 may change the location of placement and/or the direction of placement of the source component. If no interference is detected, then at step 432, it is determined whether the source component is to be assembled at any other location of the target component. If it is determined that the source component is to be assembled at any other location, then the process 400 is routed to the step 422, in which another location of placement in the target component is determined.

If the source component is not to be assembled at any other location, then step 434 is performed. At step 434, it is determined whether there are any other source components remaining for assembling with the target component. If the source component(s) are remaining for assembling with the target component, then the process 400 is routed to the step 412. If all source components are assembled with the target component, then at step 436, a geometric model depicting assembly of the source components and the target component is outputted on a graphical user interface.

Figure 5:
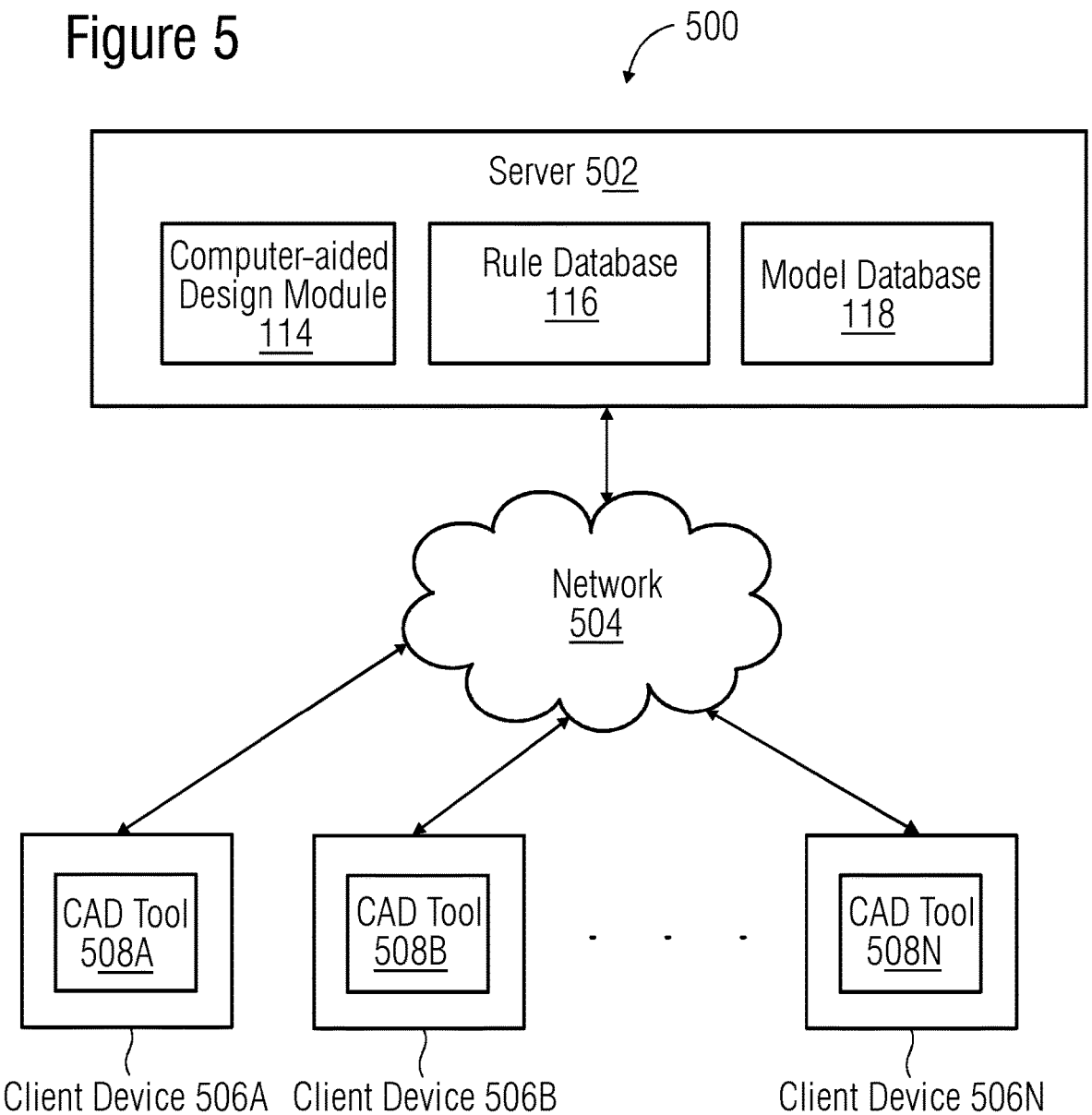
FIG. 5 is a block diagram of client-server architecture which provides geometric modeling of components representing different parts of a real-world object, according to one embodiment.

FIG. 5 is a block diagram of client-server architecture 500 that provides geometric modeling of components representing different parts of a real-world object, according to one embodiment. Particularly, the client-server architecture 500 includes a server 502 and a plurality of client devices 506A-N. Each of the client devices 506A-N is connected to the server 502 via a network 504 (e.g., Local Area Network (LAN), Wide Area Network (WAN), Wi-Fi, etc.). The server 502 is an exemplary implementation of the data processing system 100 as shown in FIG. 1.

The server 502 includes the computer-aided design module 114, the rule database 116, and the model database 118. The computer-aided design module 114 may be stored on the server 502 in the form of machine-readable instructions. The server 502 may include an accessible memory in which the machine-readable instructions are stored. The server 502 may include a processor for executing the machine-readable instructions. The server 502 may also include a storage unit for storing the rule database 116 and the model database 118. Additionally, the server 502 may include a network interface for communicating with the client devices 506A-N via the network 504. The machine-readable instructions may cause the processor to generate constraints between components based on the set of rules stored in the rule database 116.

The client devices 506A-N are provided with computer-aided design tools 508A-N. Users of the client devices 506A-N can access the server 502 via the graphical user interface of the respective computer-aided design tools 508A-N. In an embodiment, a user of the client device 506A may send a request to the server 502 to load a CAD file containing information associated with components to be assembled using the computer-aided design tool 508A. The server 502 may send the CAD file to the client device 506A via the network 504. The client device 506A may send a request for assembling two or more components in the CAD file to the server 502. Accordingly, the computer-aided design module 114 in the server 502 generates constraints between the components and outputs a geometric model containing the constrained components on the graphical user interface of the computer-aided design tool 508A of the client device 506A, as described in FIG. 2 to 4. One skilled in the art may envision that the present embodiments may be implemented in a cloud computing environment, where the computer-aided design module 114 is hosted on a cloud server.

Figure 6B:
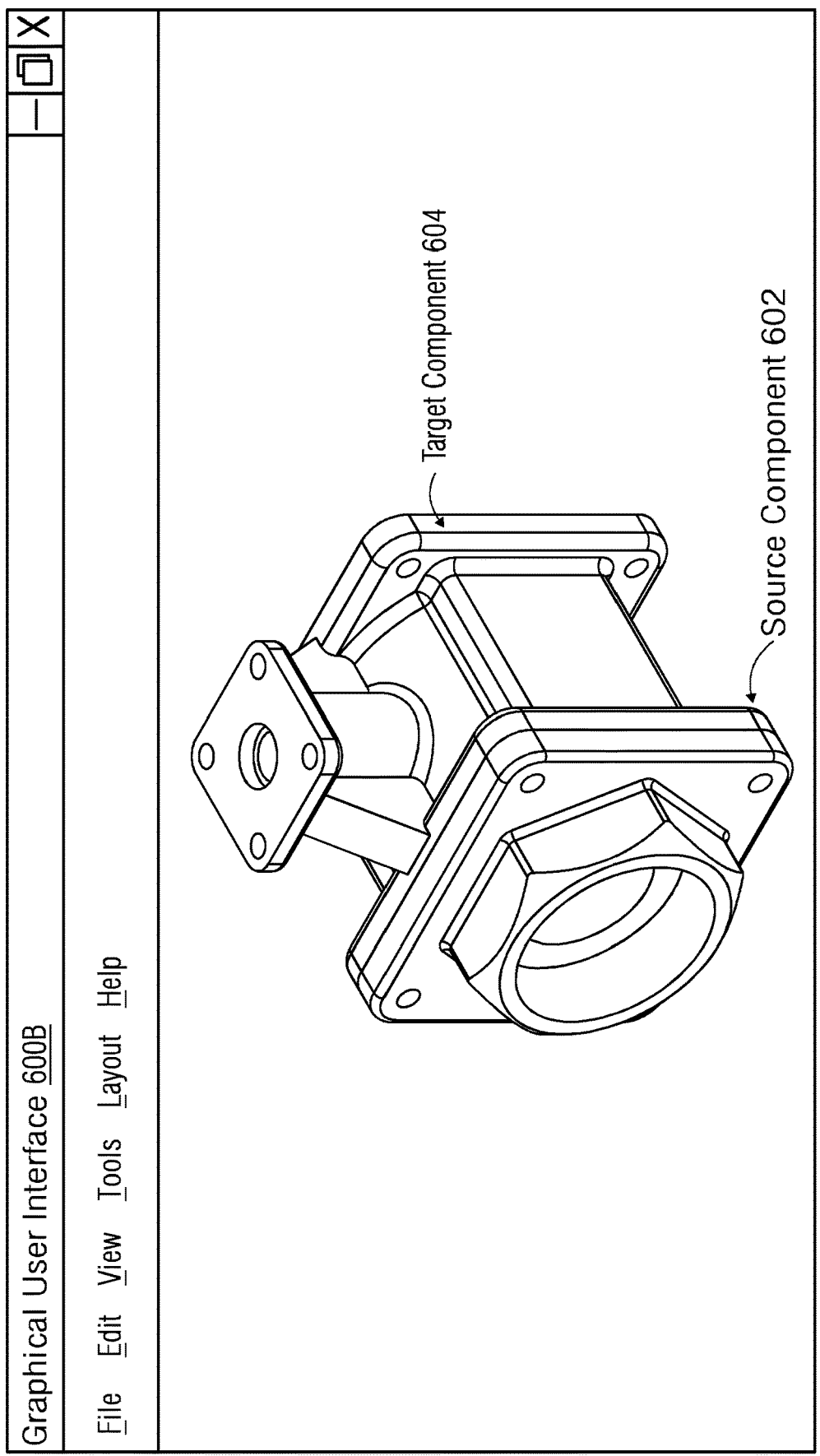
FIGS. 6A to 9B are graphical user interface views depicting assembly of a source component with a target component, according to one embodiment.

FIGS. 6A to 9B are graphical user interface views depicting assembly of a source component with a target component, according to one embodiment. FIG. 6A illustrates a graphical user interface view 600A depicting a source component 602 and a target component 604. As shown in FIG. 6A, the source component 602 contains a shaft 606 and the target component 604 contains a hole 608. When a user performs drag operation on the component 602, the computer-aided design module 114 determines that the component 602 is source component and the component 604 is target component. The computer-aided design module 114 also determines that the source component 602 contains a geometric feature 'shaft' 606 and the target component 604 contains a geometric feature 'hole' 608. Then, the computer-aided design module 114 compares the geometric feature 'shaft' 606 of the source component 602 with the geometric feature 'hole' 608 of the target component 604 and finds a match between the shaft 606 and the hole 608. The computer-aided design module 114 determines a location of placement of the source component 602 and creates assembly relationships (i.e., mate between adjacent planar faces of the shaft 606 and the hole 608, and aligns non-axial holes) between the source component 602 and the target component 604. Accordingly, the computer-aided design module 114 generates constraints between the shaft 606 of the source component 602 and the hole 608 of the target component 604 and outputs a geometric model (i.e., union of the source component 602 and the target component 604) on a graphical user interface 600B, as shown in FIG. 6B. Similarly, the computer-aided design module 114 determines that the source component 602 may be assembled on an opposite side of the target component 604. Accordingly, the computer-aided design module 114 generates constraints between the shaft 606 of the source component 602 and the hole 608 of the target component 604 and outputs a geometric model on a graphical user interface 600C as shown in FIG. 6C.

Figure 7A:
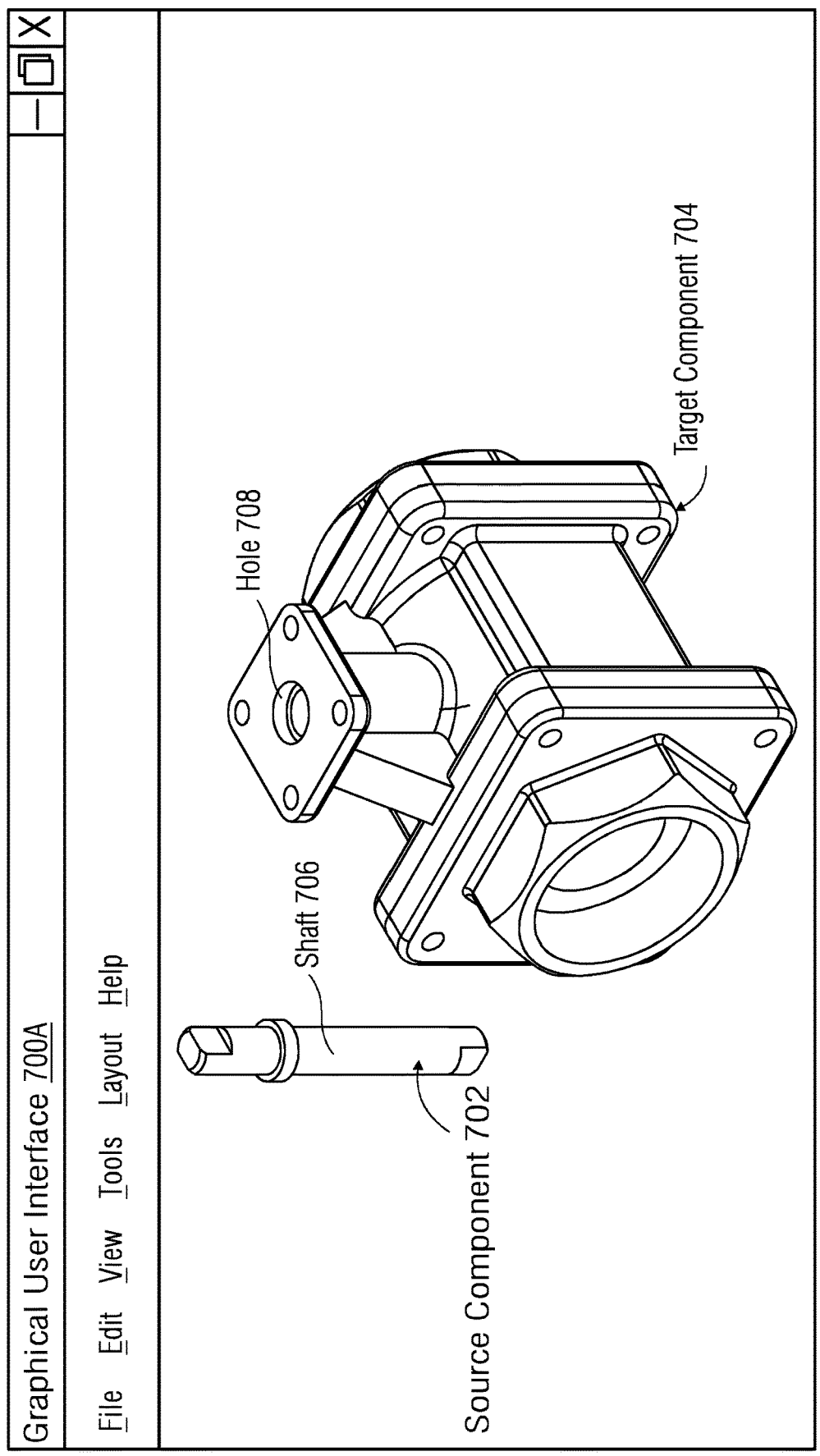
Figure 7B:
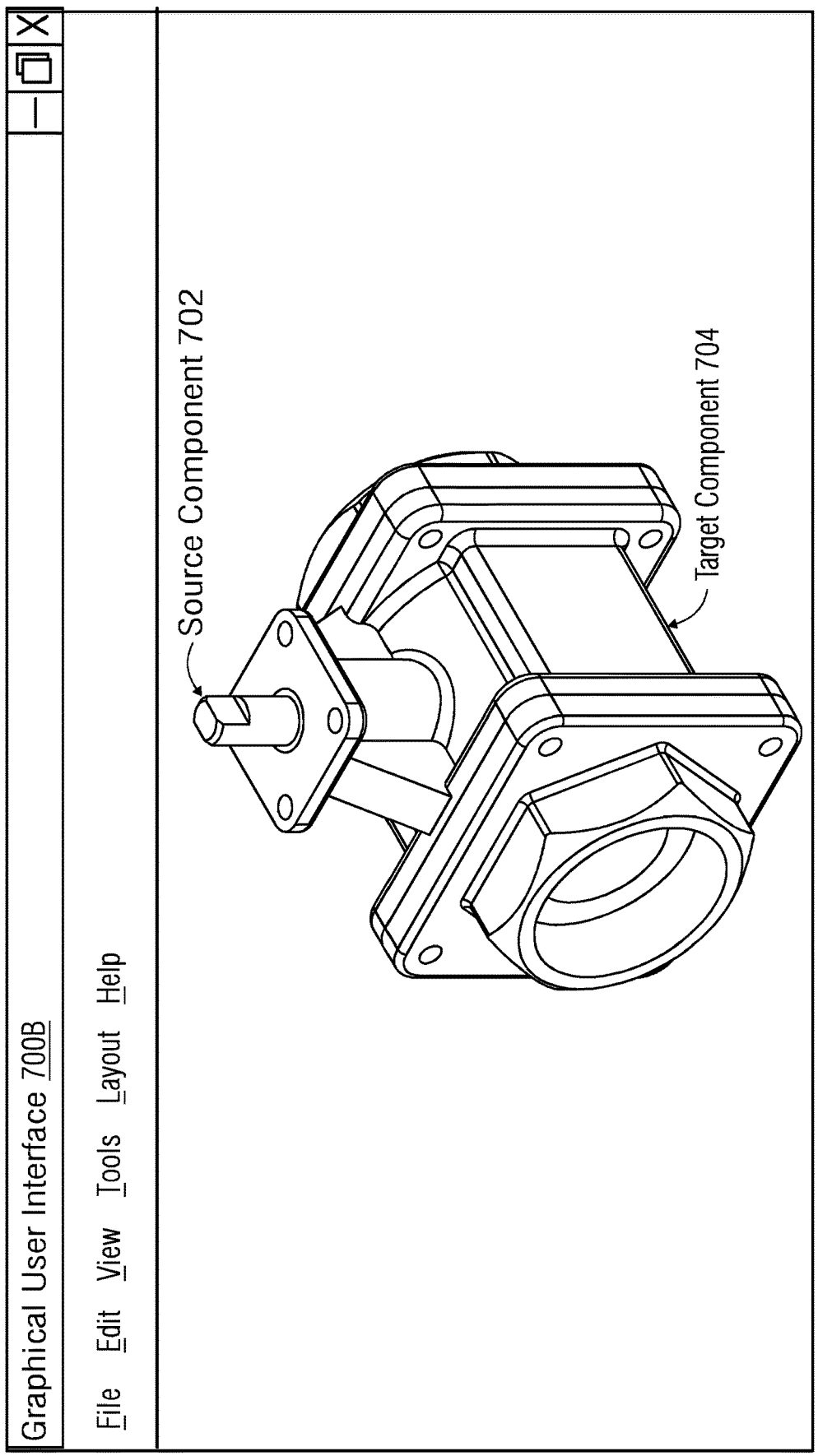

FIG. 7A illustrates a graphical user interface view 700A depicting a source component 702 and a target component 704. The target component 704 is the geometric model displayed on the graphical user interface 600C in FIG. 6C. As shown in FIG. 7A, the source component 702 contains a shaft 706 and the target component 704 contains a hole 708. When a user performs drag operation on the component 702, the computer-aided design module 114 determines that the component 702 is source component and the component 704 is target component. The computer-aided design module 114 also determines that the source component 702 contains a geometric feature 'shaft' 706 and the target component 704 contains a geometric feature 'hole' 708. Then, the computer-aided design module 114 compares the geometric feature 'shaft' 706 of the source component 702 with the geometric feature 'hole' 708 of the target component 704 and finds a match between the shaft 706 and the hole 708. The computer-aided design module 114 determines a location of placement of the source component 702 and creates assembly relationships (i.e., mate between adjacent planar faces of the shaft 706 and the hole 708 and rotation locked as non-axial hole not available) between the source component 702 and the target component 704. Accordingly, the computer-aided design module 114 generates constraints between the shaft 706 of the source component 702 and the hole 708 of the target component 704 and outputs a geometric model (i.e., union of the source component 702 and the target component 704) on a graphical user interface 700B as shown in FIG. 7B.

Figure 8A:
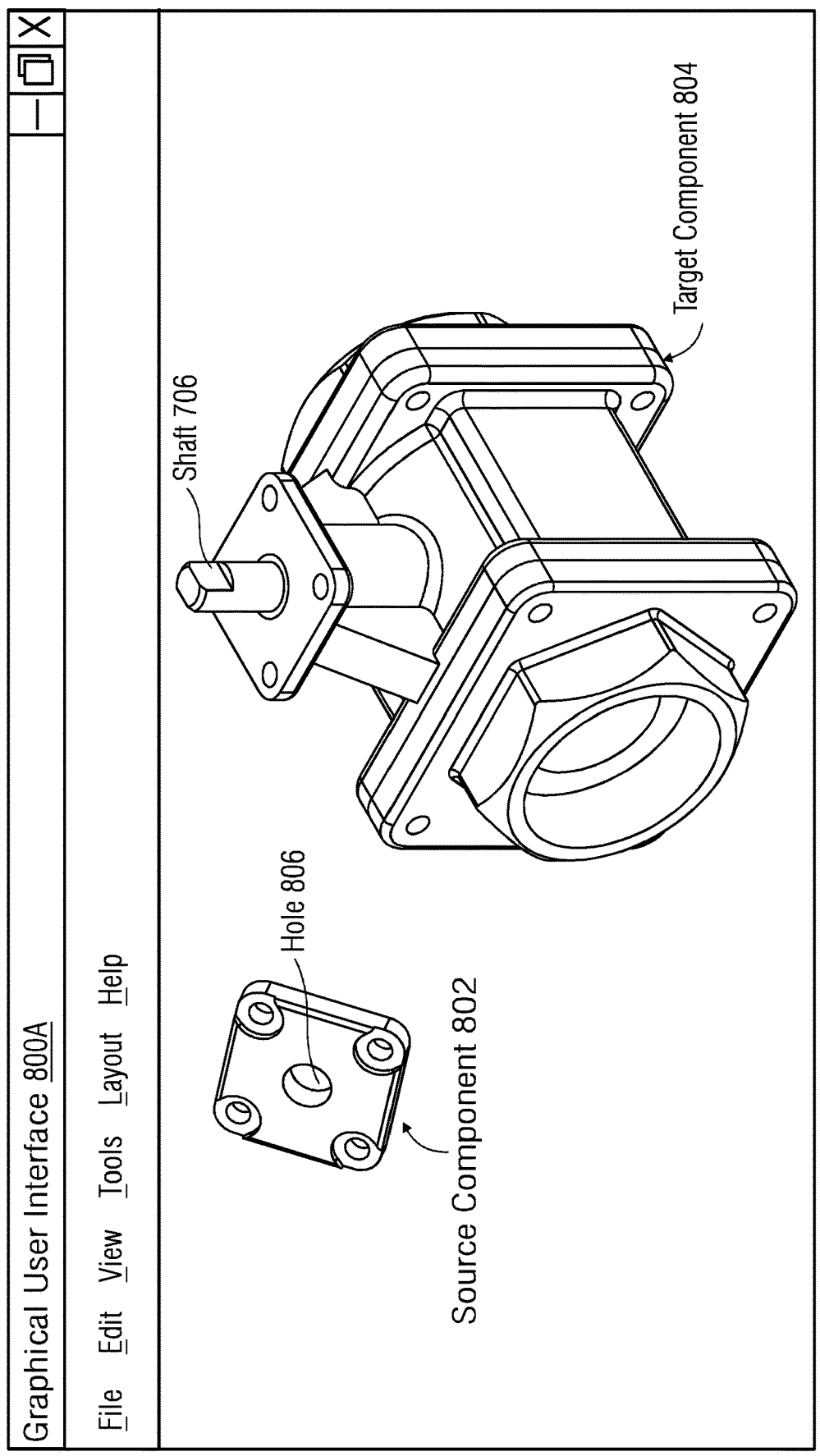
Figure 8B:
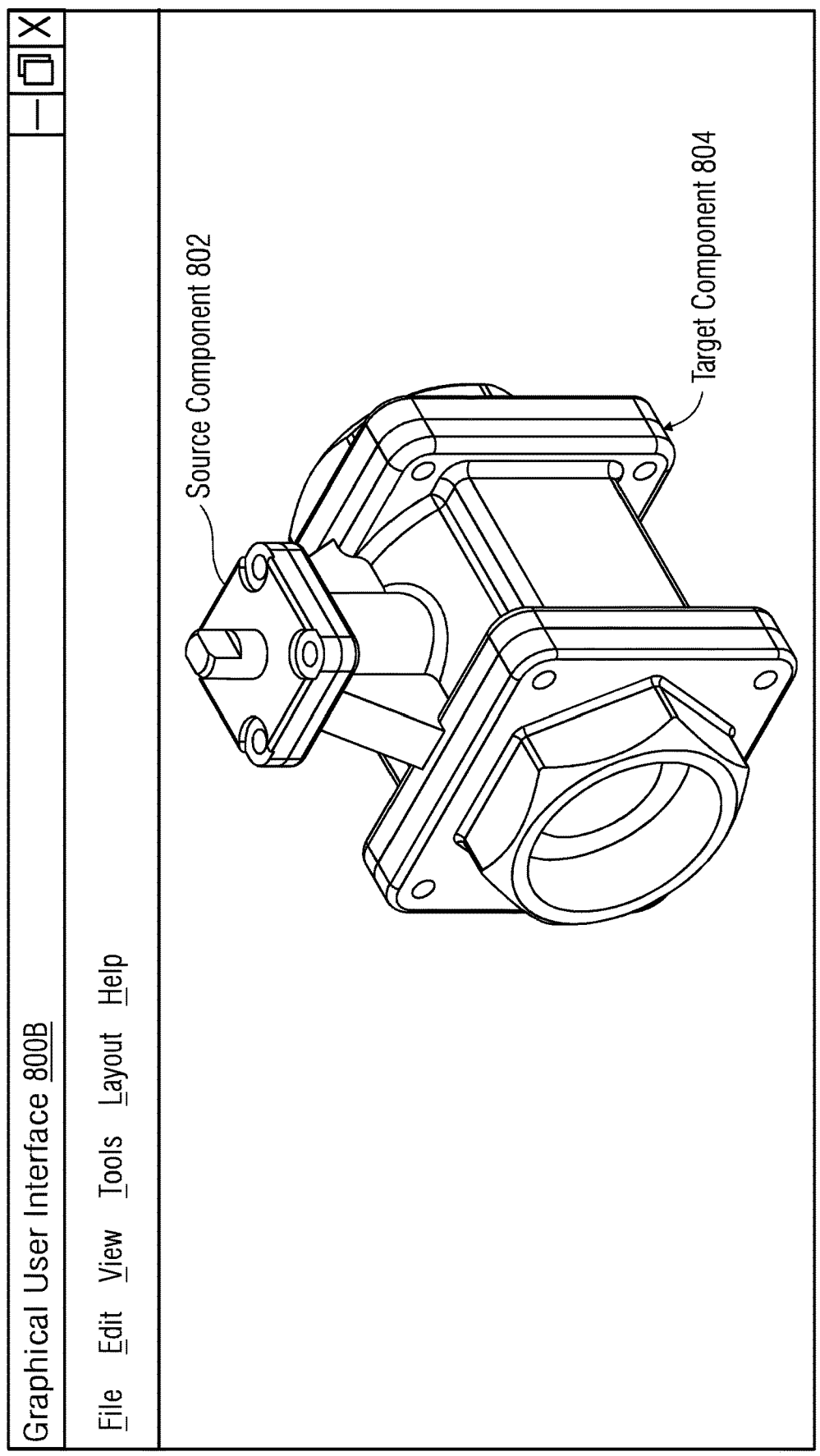

FIG. 8A illustrates a graphical user interface view 800A depicting a source component 802 and a target component 804. The target component 804 is the geometric model displayed on the graphical user interface 700B in FIG. 7B. As shown in FIG. 8A, the source component 802 contains a hole 806 and the target component 804 contains a shaft 706. When a user performs drag operation on the component 802, the computer-aided design module 114 determines that the component 802 is source component and the component 804 is target component. The computer-aided design module 114 also determines that the source component 802 contains a geometric feature 'hole' 806 and the target component 804 contains a geometric feature 'shaft' 706. Then, the computer-aided design module 114 compares the geometric feature 'hole' 806 of the source component 802 with the geometric feature 'shaft' 706 of the target component 804 and finds a match between the hole 806 and the shaft 706. The computer-aided design module 114 determines a location of placement of the source component 802 and creates assembly relationships (i.e., mate between adjacent planar faces of the shaft 706 and the hole 708 and aligns non-axial hole) between the source component 802 and the target component 804. Accordingly, the computer-aided design module 114 generates constraints between the hole 806 of the source component 802 and the shaft 706 of the target component 804 and outputs a geometric model (i.e., union of the source component 802 and the target component 804) on a graphical user interface 800B as shown in FIG. 8B.

Figure 9A:
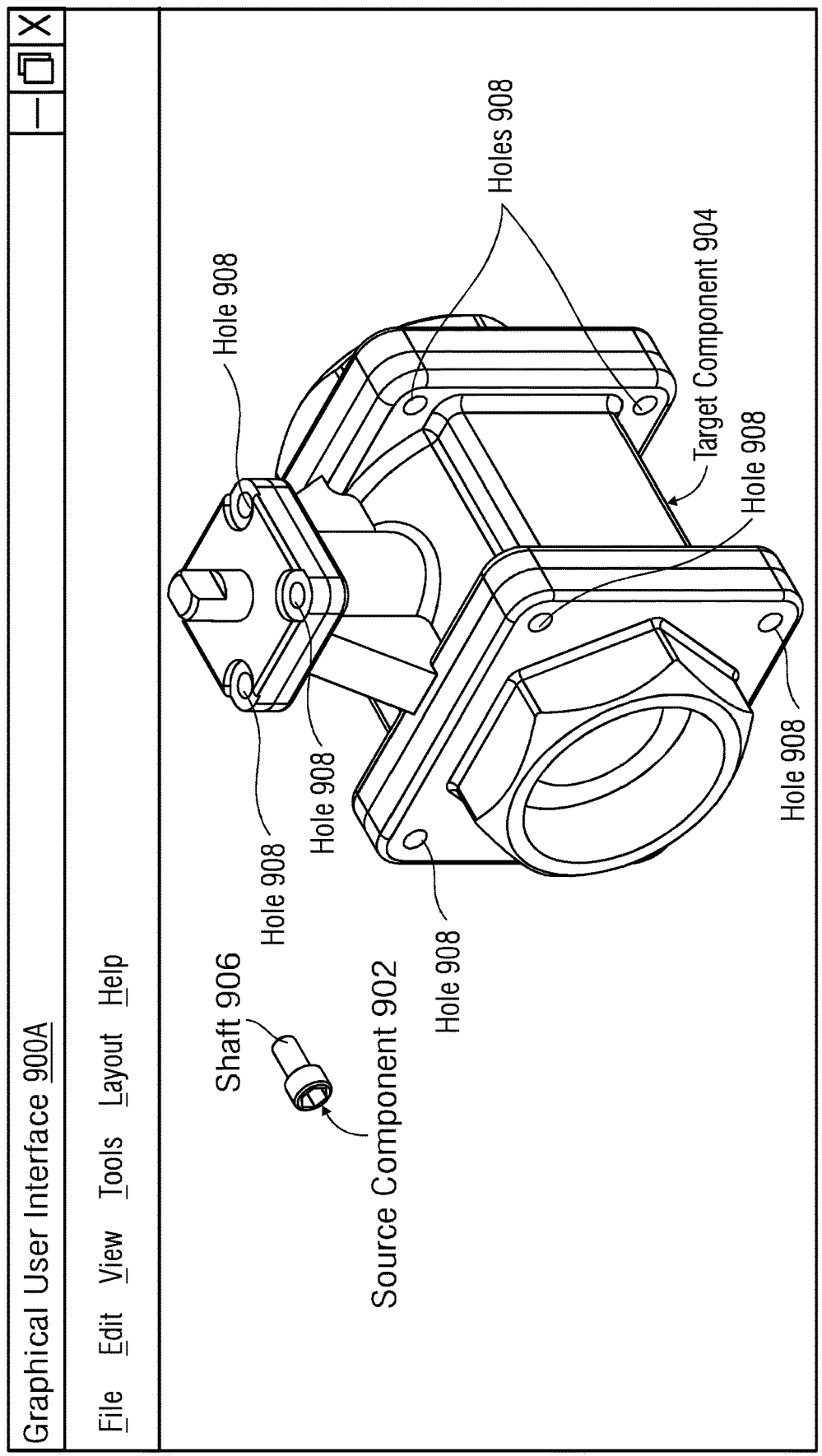
Figure 9B:
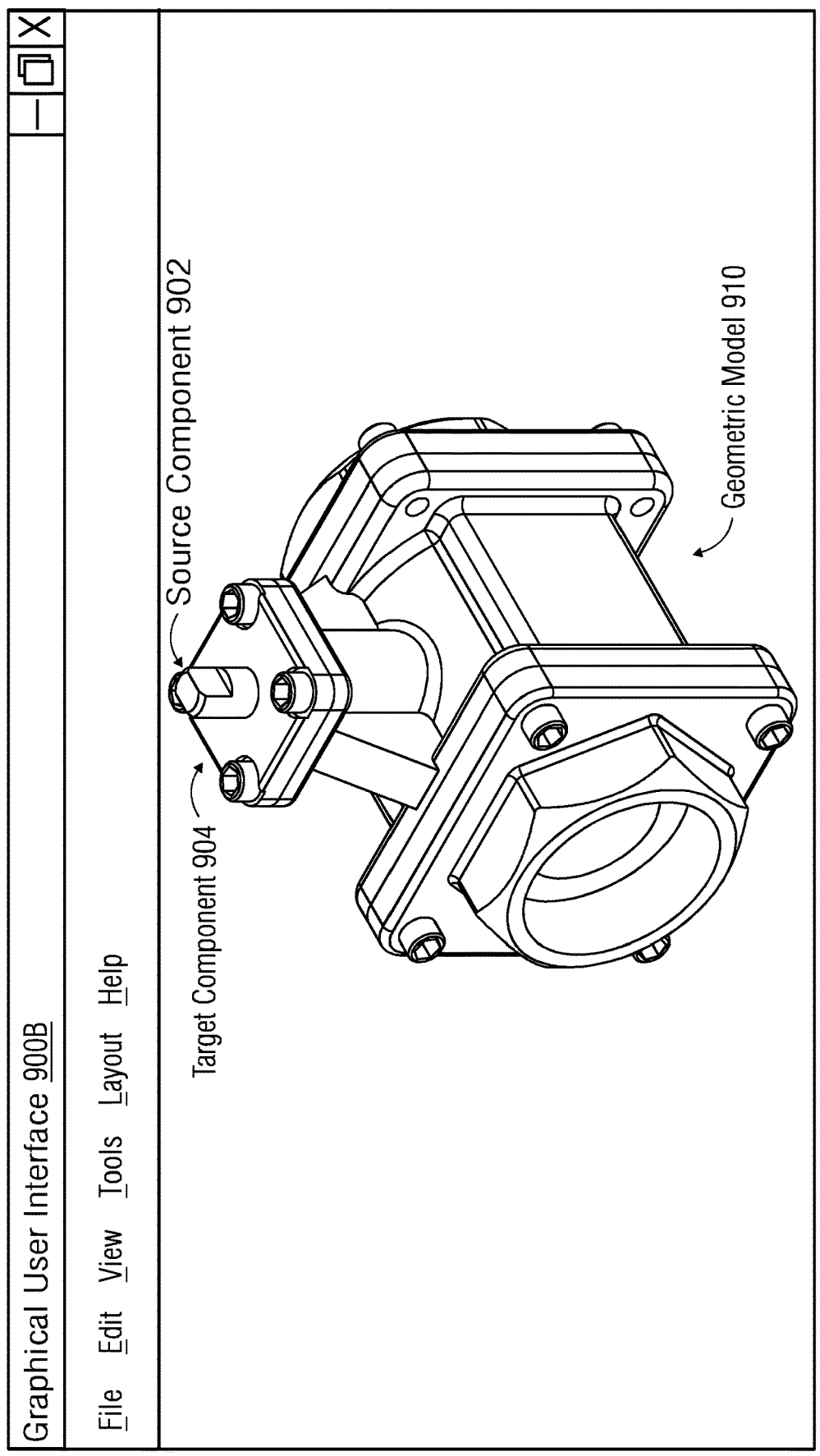

FIG. 9A illustrates a graphical user interface view 900A depicting a source component 902 and a target component 904. The target component 904 is the geometric model displayed on the graphical user interface 800B in FIG. 8B. As can be seen from FIG. 9A, the source component 902 is an Allen screw and the target component 904 contains holes 908 where the Allen screw 902 needs to be placed. When a user performs drag operation on the component 902, the computer-aided design module 114 determines that the component 902 is source component and the component 904 is target component. The computer-aided design module 114 also determines that the source component 902 contains a geometric feature 'shaft' 906 and the target component 904 contains geometric features 'hole' 908. Then, the computer-aided design module 114 compares the geometric feature 'shaft' 906 of the source component 902 with the geometric features 'hole' 908 of the target component 904 and finds a match between the shaft 906 and the holes 908. The computer-aided design module 114 determines a location of placement and direction of placement (i.e., from outside to inside) of the source component 902. Then, the computer-aided design module 114 creates assembly relationships (i.e., mate between adjacent planar faces of the shaft 906 and the holes 908 and rotation locked as non-axial hole not available) between the source component 902 and the target component 904. Accordingly, the computer-aided design module 114 generates constraints between the shaft 906 and the holes 908 and outputs a geometric model 910 (i.e., union of the source component 902 and the target component 904) on a graphical user interface 900B as shown in FIG. 9B. The source component 902 is placed in the different locations (i.e., holes 908) of the target component 904 using a single click of mouse button. Therefore, manual efforts required to assemble components are significantly saved. In this manner, source components are assembled with a target component.

Figure 10A:
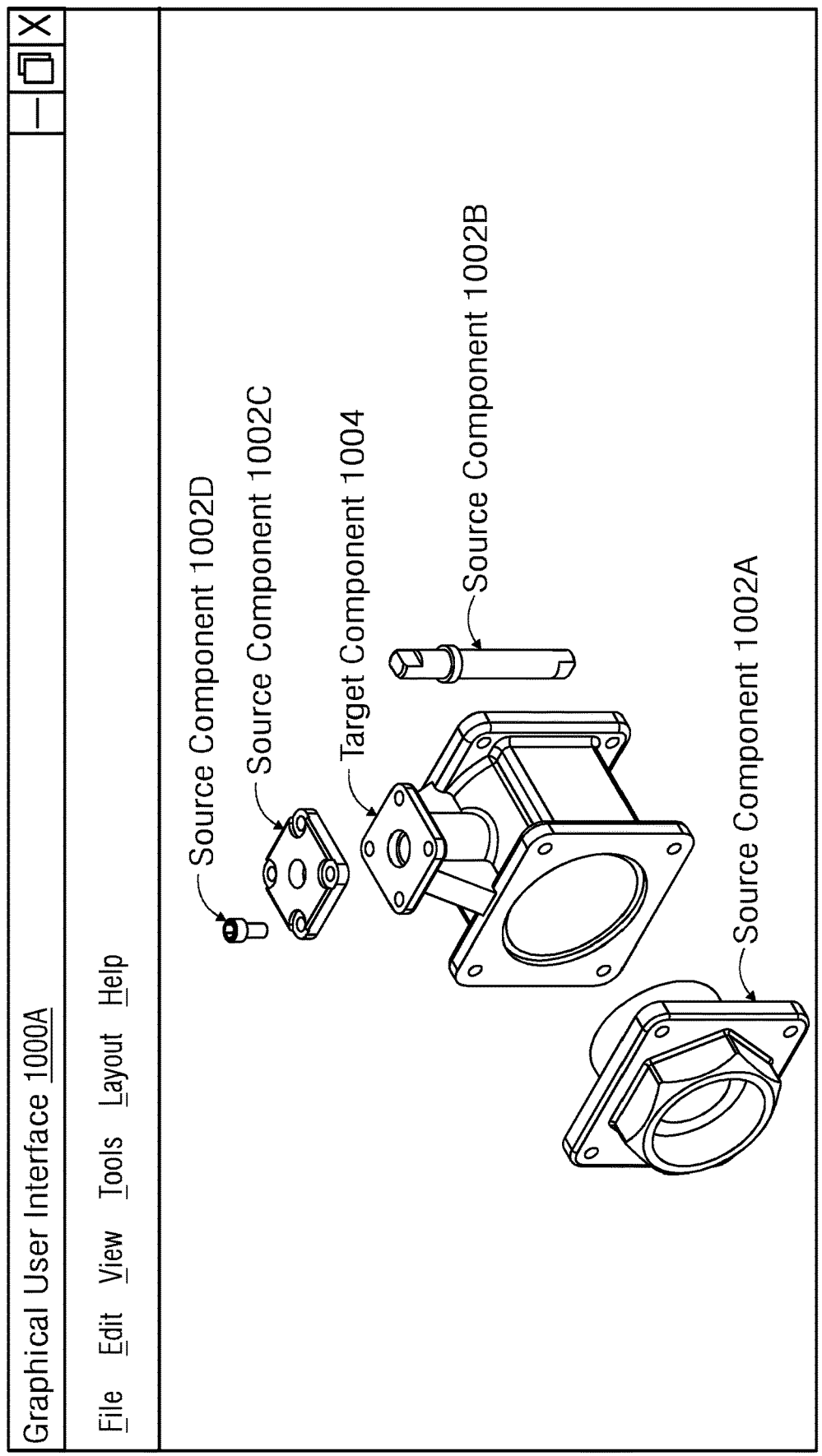

FIGS. 10A and 10B are graphical user interface views 1000A and 1000B depicting assembly of multiple source components 1002A-D with a target component 1004, according to another embodiment. FIG. 10A illustrates a graphical user interface view 1000A depicting the source components 1002A-D and the target component 1004. The computer-aided design module 114 enables the user to assemble the multiple source components 1002A-D in the target component 1004 via a single mouse click, as described above. However, the sequence in which the source components 1002A-D are assembled with the target component 1004 is based on size of the source components 1002A-D. For example, a source component (e.g., the source component 1002A) with the highest volume is first selected for assembly with the target component 1004 followed by a source component (e.g., the source component 1002C) having lesser volume than the source component 1002A. In this manner, all the source components 1002A-D are assembled with the target component 1004 and a geometric model 1006 is outputted on a graphical user interface 1000B as shown in FIG. 10B.

In various embodiments, methods and systems described above in FIGS. 1 to 10B disclose generating constraints between geometric features of the components to form a geometric model in a CAD environment. Thus, need for positioning components in an assembly and defining constraint relationship between the components based on user inputs is eliminated. This helps in saving manual effort as well as significantly reduces design time. Also, automatic assembling of the components in the CAD environment is free from human errors.

Those skilled in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 100 may conform to any of the various current implementation and practices known in the art.

The system and methods described herein may be implemented in various forms of hardware, software, firmware, special purpose processors, or a combination thereof. One or more of the present embodiments may take the form of a computer program product including program modules accessible from computer-usable or computer-readable medium storing program code for use by or in connection with one or more computers, processors, or instruction execution systems. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device), or the propagation mediums in and of themselves as signal carriers that are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the art.

While the present disclosure has been described in detail with reference to certain embodiments, the present disclosure is not limited to these embodiments. In view of the present disclosure, many modifications and variations would be present to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope of the claims.

What is claimed is:

1. A computer-implemented method of assembling a plurality of components in a computer-aided design (CAD) environment using a CAD tool, the computer-implemented method comprising:
   determining, using a data processing system of the CAD environment, at least one source component and a target component from the plurality of components in a CAD electronic file of the CAD environment, wherein the at least one source component and the target component represent different parts of a real-world object;
   determining one or more geometric features of the at least one source component and one or more geometric features of the target component;
   sequentially comparing the geometric features of the at least one source component with the geometric features of the target component, wherein each of the geometric features of the source component is compared with at least one corresponding feature of the target wherein the order of comparison represents the sequence of the comparison;
   generating constraints between the geometric features of the at least one source component and the geometric features of the target component based on the outcome of the comparison, wherein generating the constraints between the geometric features of the at least one source component and the geometric features of the target component comprises:
   (a) determining a match between the geometric features of the at least one source component and the geometric features of the target component based on the outcome of comparison;
   (b) determining at least one location of placement of the at least one source component with respect to the target component based on the match;
   (c) determining a direction of placement of the at least one source component with respect to the target component based on a set of predefined rules;
   (d) computing assembly relationships between the matched pair of geometric features of the at least one source component and the target component based on the location and direction of placement; and
   (e) generating constraints between the matched pair of geometric features of the at least one source component and the target component based on the computed assembly relationships between the matched pair of geometric features; and
   outputting a geometric model comprising an assembly of the at least one source component and the target component on a graphical user interface of the CAD tool.

2. The method of claim 1, wherein comparing the geometric features of the at least one source component with the geometric features of the target component comprises:
   determining whether there are same types of geometric features in the sorted pre-determined order of comparison of geometric features between the geometric features of the at least one source component and the geometric features of the target component;
   and when the same types of geometric features are present between the geometric features of the at least one source component and the geometric features of the target component, comparing each of the geometric features of the at least one source component with corresponding geometric features of the target component according to size of the geometric features.

3. The method of claim 1, wherein the geometric features of the at least one source component and the geometric features of the target component are selected from the group consisting of shaft, hole, taper shaft, taper hole, keyway shaft, keyway hole, extruded feature, and cutout feature.

4. The method of claim 1, wherein the at least one source component comprises a plurality of source components and wherein determining the at least one source component and the target component from the plurality of components in the CAD electronic file of the CAD environment comprises:
   determining a volume of each source component of the plurality of source components;
   and selecting one or more source components from the plurality of source components for assembling with the target component based on the volumes of each of the plurality of source components.

5. The method of claim 1, further comprising creating a ground relationship using the target component, wherein a volume of the target component is highest among respective volumes of respective components of the plurality of components in the CAD electronic file of the CAD environment.

6. The method of claim 1, further comprising:
   determining whether there is interference caused due to assembly of the at least one source component with the target component; and when the interference is detected, repeating the comparing of the geometric features, the generating of constraints between the geometric features, and the determining of whether there is interference until no interference is detected between the at least one source component and the target component.

7. A data processing system for a computer-aided design (CAD) environment, the data processing system comprising:
a processor;
a display unit coupled to the processor;
and an accessible memory coupled to the processor, wherein the accessible memory comprises a computer-aided design module configured to:
determine at least one source component and a target component from a plurality of components in a CAD electronic file of the CAD environment, wherein the at least one source component and the target component represent different parts of a real-world object;
determine one or more geometric features of the at least one source component and one or more geometric features of the target component;
sequentially compare the geometric features of the at least one source component with the geometric features of the target component, wherein each of the geometric features of the component according to a sorted pre-determined order of comparison of geometric features, wherein the order of comparison represents the sequence of the comparison;
generate constraints between the geometric features of the at least one source component and the geometric features of the target component based on an outcome of the comparison, wherein the computer-aided design module is further configured to:
(a) determine a match between the geometric features of the at least one source component and the geometric features of the target component based on the outcome of comparison;
(b) determine at least one location of placement of the at least one source component with respect to the target component based on the match;
(c) determine a direction of placement of the at least one source component with respect to the target component;
(d) compute assembly relationships between the matched pair of geometric features of the at least one source component and the target component based on the location and direction of placement of the at least one source component; and
(e) generate constraints between the matched pair of geometric features of the at least one source component and the target component based on the computed assembly relationships between the matched pair of geometric features; and
output a geometric model comprising an assembly of the at least one source component and the target component on the display unit.

8. The data processing system of claim 7, wherein in the comparison of the geometric features of the at least one source component with the geometric features of the target component, the computer-aided design module is further configured to:
determine whether there are same types of geometric features in the sorted pre-determined order of comparison of geometric features between the geometric features of the at least one source component and the geometric features of the target component; and
compare each of the geometric features of the at least one source component with corresponding geometric features of the target component according to size of the geometric features if the same types of geometric features are present.

9. The data processing system of claim 8, wherein the at least one source component comprises a plurality of source components and wherein in the determination of the at least one source component and the target component in the CAD environment, the computer-aided design module is further configured to:
determine a volume of each source component of the plurality of source components; and
select one or more source components from the plurality of source components for assembling with the target component based on the volumes of each of the plurality of source components.

10. The data processing system of claim 7, wherein the computer-aided design module is further configured to create a ground relationship using the target component, and wherein a volume of the target component s highest among respective volumes of respective components of the plurality of components n the CAD electronic file of the CAD environment.

11. The data processing system of claim 7, wherein the computer-aided design module is further configured to:
determine whether there is interference caused due to assembly of the at least one source component and the target component; and
when the interference is detected, repeat the comparison of the geometric features, the generation of the constraints between the geometric features, and the determination of whether there is interference until no interference is detected between the at least one source component and the target component.

12. A non-transitory computer-readable storage medium that stores instructions executable by a data processing system to assemble a plurality of components in a computer-aided design (CAD) environment, the instructions comprising:
determining at least one source component and a target component from the plurality of components in a CAD electronic file of the CAD environment, wherein the at least one source component and the target component represent different parts of a real-world object;
determining one or more geometric features of the at least one source component and one or more geometric features of the target component;
sequentially comparing the geometric features of the at least one source component with the geometric features of the target component, wherein each of the geometric features of the source component is compared with at least one corresponding feature of the target component according to a sorted pre-determined order of comparison of geometric features,
wherein the order of comparison represents the sequence of the comparison;
generating constraints between the geometric features of the at least one source component and the geometric features of the target component based on an outcome of the comparison, wherein generating the constraints between the geometric features of the at least one source component and the geometric features of the target component comprises:

(a) determining a match between the geometric features of the at least one source component and the geometric features of the target component based on the outcome of comparison;
(b) determining at least one location of placement of the at least one source component with respect to the target component based on the match;
(c) determining a direction of placement of the at least one source component with respect to the target component based on a set of predefined rules;
(d) computing assembly relationships between the matched pair of geometric features of the at least one source component and the target component based on the location and direction of placement; and
(e) generating constraints between the matched pair of geometric features of the at east one source component and the target component based on the computed assembly relationships between the matched pair of geometric features; and outputting a geometric model comprising an assembly of the at east one source component and the target component on a graphical user interface of the CAD environment.

13. The non-transitory computer-readable storage medium of cairn 12, wherein the at least one source component comprises a plurality of source components and wherein determining the at least one source component and the target component in the CAD electronic of the CAD environment comprises:

determining a volume of each source component of the plurality of source components;

and selecting a source component of the plurality of source components for assembling with the target component based on the volumes of each of the plurality of source components.

14. The non-transitory computer-readable storage medium of claim 12, wherein the instructions further comprise:

creating a ground relationship using the target component, wherein a volume of the target component is highest among respective volumes of respective components of the plurality of components in the CAD electronic file of the CAD environment.

\* \* \* \* \*